United States Patent
Sutou et al.

(10) Patent No.: US 8,359,419 B2
(45) Date of Patent: Jan. 22, 2013

(54) SYSTEM LSI HAVING PLURAL BUSES

(75) Inventors: Shinichi Sutou, Tokyo (JP); Kiyomitsu Katou, Yokohama (JP)

(73) Assignee: Fujitsu Limited, Kawasaki (JP)

(*) Notice: Subject to any disclaimer, the term of this patent is extended or adjusted under 35 U.S.C. 154(b) by 362 days.

(21) Appl. No.: 12/617,291

(22) Filed: Nov. 12, 2009

(65) Prior Publication Data
US 2010/0169532 A1   Jul. 1, 2010

(30) Foreign Application Priority Data
Dec. 25, 2008  (JP) .................... 2008-329132

(51) Int. Cl.
*G06F 13/14*   (2006.01)

(52) U.S. Cl. .................. 710/306; 711/148; 711/153

(58) Field of Classification Search .............. 710/306, 710/316; 711/148–150, 153
See application file for complete search history.

(56) References Cited

U.S. PATENT DOCUMENTS

| | | | |
|---|---|---|---|
| 4,965,717 A | 10/1990 | Cutts, Jr. et al. | |
| 5,829,032 A | 10/1998 | Komuro et al. | |
| 6,434,646 B1* | 8/2002 | Sugiyama | 710/100 |
| 7,373,450 B2* | 5/2008 | Kamegawa | 710/316 |
| 2006/0218335 A1* | 9/2006 | Hofmann et al. | 710/316 |
| 2008/0140904 A1* | 6/2008 | Jeddeloh | 710/317 |
| 2011/0055451 A1* | 3/2011 | Ware et al. | 710/316 |

FOREIGN PATENT DOCUMENTS

| | | |
|---|---|---|
| JP | 7-9625 | 2/1995 |
| JP | 8-185359 | 7/1995 |
| JP | 09-34741 | 2/1997 |

* cited by examiner

*Primary Examiner* — Glenn A Auve
(74) *Attorney, Agent, or Firm* — Staas & Halsey LLP

(57) ABSTRACT

A system LSI includes first and second memories, first and second buses, a bus bridge that performs signal transfer between the first and second buses, a first bus system connecting to the first bus and accessing the first or second memory, a second bus system connecting to the second bus and accessing the first or second memory, a memory access circuit having first and second bus-side input/output terminals that perform signal transfer to/from the first and second buses and first and second memory-side input/output terminals that perform signal transfer to/from the first and second memories.

15 Claims, 14 Drawing Sheets

SYSTEM LSI HAVING PLURAL BUSES

CROSS-REFERENCE TO RELATED APPLICATIONS

This application is based upon and claims the benefit of priority from the prior Japanese Patent Application No. 2008-329132 filed on Dec. 25, 2008, the entire contents of which are incorporated herein by reference.

BACKGROUND

1. Field

The present invention relates to system LSIs, and it particularly relates to a system LSI having plural buses.

2. Description of the Related Art

A system LSI (Large Scale integrated Circuit) internally includes, within one chip, a memory and plural devices having separate functions such as a processor (which will be called CPU hereinafter), an arithmetic circuit, a communication circuit, and an external interface circuit. The memory and the plural devices are mutually connected through a bus, and the bus is used to perform data transfer between the memory and the devices.

As the size of such a system LSI increases, the number of devices to be included therein increases and the size of one chip increases. Thus, it becomes more difficult to connect the internally included memory and the plural devices through one common bus because of physical constraints and constraints with high-speed operations. In other words, connecting many devices contained within a large chip through one common bus is difficult in layout, and the increase in wiring capacitance of the bus may lower the data transfer rate.

Accordingly, system LSIs in recent years have had plural bus systems, and internally included memories and devices have been connected to different buses. Furthermore, the plural buses have been connected through a bus bridge internally including an FIFO, for example, to allow data transfer between the devices and memories connecting to the different buses. Thus, the wires of the buses have been shorter, which has made the layout easier and could keep a high data transfer rate between the devices and memories connecting to the buses.

FIG. 1 is an example of a block diagram of a system LSI in the past. The system LSI has devices including a CPU 3, hardware 4 such as an arithmetic circuit, a peripheral 5 such as an external interface and memories 11 and 12. The system LSI further has two buses 1 and 2. The CPU 3 and a memory controller 13 connect to the bus 1, and the hardware 4, the peripheral 5 and a memory controller 14 connect to the bus 2. Both of the buses 1 and 2 are connected through a bus bridge 10, and through the bus bridge 10, the data transfer between the buses is achieved. The access to the memories 11 and 12 are controlled by the memory controllers 13 and 14.

Because the system LSI illustrated in FIG. 1 has the two buses, when the CPU 3 accesses the memory 11 through the bus 1, the peripheral 5 can access the hardware 4 through the bus 2 simultaneously. Furthermore, the CPU 3 may access the memory 12 through the bus 1, bus bridge 10 and bus 2. In this way, the memories and devices connecting to different buses may be accessed each other.

Japanese Laid-open Patent Publication No. 08-185359 discloses a bus bridge that matches a cache memory and a main storage memory in order for a processor to perform proper data processing in a multi-level cache in NUMA, which is a protocol for a multiprocessor system.

Japanese Laid-open Patent Publication No. 09-34741 discloses a memory copy system including a counter exhibiting a memory address in an information processing system which is redundantly including plural subsystems each having a memory in order to perform memory copy between/among the subsystems. With reference to the counter, a program, for example, may be read from the corresponding address as required and be copied to the memory in a different subsystem.

Japanese Examined Patent Application Publication No. 07-9625 discloses a configuration of a computer having a fault-tolerant capability by using plural CPUs, plural memories and plural buses.

SUMMARY

According to an aspect of the embodiment, a system LSI includes first and second memories, first and second buses, a bus bridge that performs signal transfer between the first and second buses, a first bus system connecting to the first bus and accessing the first or second memory, a second bus system connecting to the second bus and accessing the first or second memory, a memory access circuit having first and second bus-side input/output terminals that perform signal transfer to/from the first and second buses and first and second memory-side input/output terminals that perform signal transfer to/from the first and second memories, wherein the memory access circuit has a first access path that connects the first bus-side input/output terminal and the first memory-side input/output terminal, a second access path that connects the second bus-side input/output terminal and the second memory-side input/output terminal, a third access path that connects the first bus-side input/output terminal and the second memory-side input/output terminal, and a fourth access path that connects the second bus-side input/output terminal and the first memory-side input/output terminal, and the memory access circuit performs signal transfer through the first to fourth access paths, and for memory access by the first or second bus system, selects at least one of the first to fourth access paths in accordance with a path-selection-mode setting signal from the first or second bus system.

The object and advantages of the embodiments described herein will be realized and attained by means of the elements and combinations particularly pointed out in the claims.

It is to be understood that both the foregoing general description and the following detailed description are exemplary and explanatory and are not restrictive of the embodiments described herein, as claimed.

The above-described embodiments of the present invention are intended as examples, and all embodiments of the present invention are not limited to including the features described above.

DETAILED DESCRIPTION OF THE PREFERRED EMBODIMENTS

Figure 1:
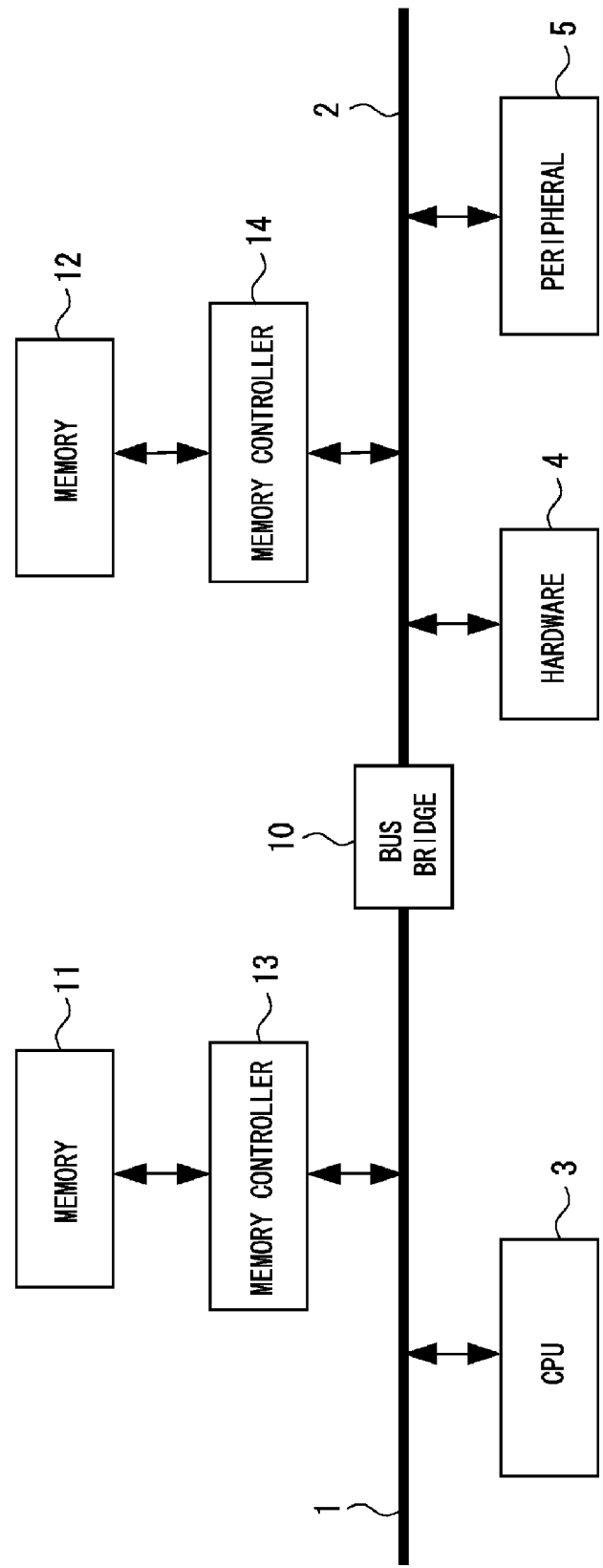
FIG. 1 is an example of a block diagram of a system LSI in the past.
Figure 2:
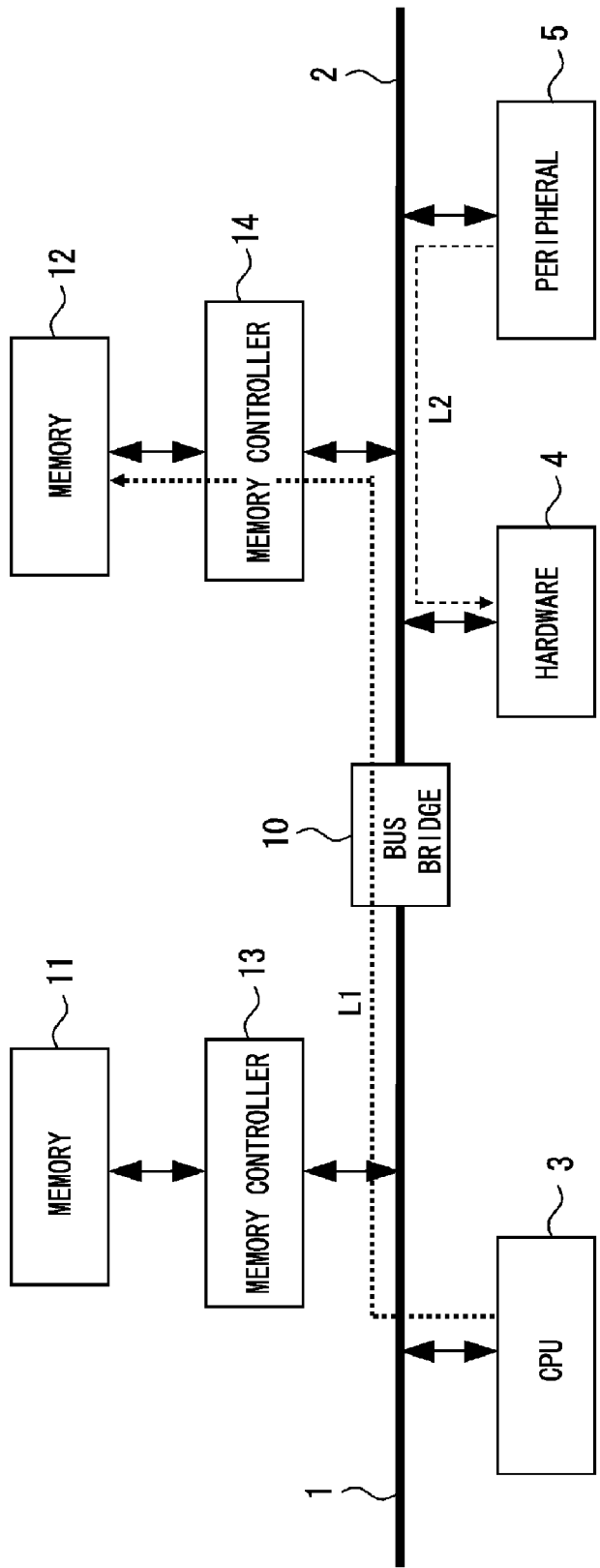
FIG. 2 is an operation example of the block diagram illustrated in FIG. 1.

Reference may now be made in detail to embodiments of the present invention, examples of which are illustrated in the accompanying drawings, wherein like reference numerals refer to like elements throughout.

With reference to drawings, embodiments of the invention will be described below.

[First Embodiment]

First of all, the outline will be described. According to this embodiment, in a system LSI having plural memories and plural buses connected through a bus bridge, a memory access circuit having access paths between the buses and the memories is provided between the plural buses and the memories. The buses connect to plural devices. An access path within the memory access circuit is selected as required, and a path between the corresponding device and the corresponding memory is set.

Thus, the device can access the memory without occupying plural buses. As a result, the unoccupied buses may be used to allow access between/among other devices and between/among other devices and memories.

[Entire Configuration According to First Embodiment]

Next, in order to grasp the overview of this embodiment, the components of this embodiment and the functions of the components will first be described briefly.

Figure 3:
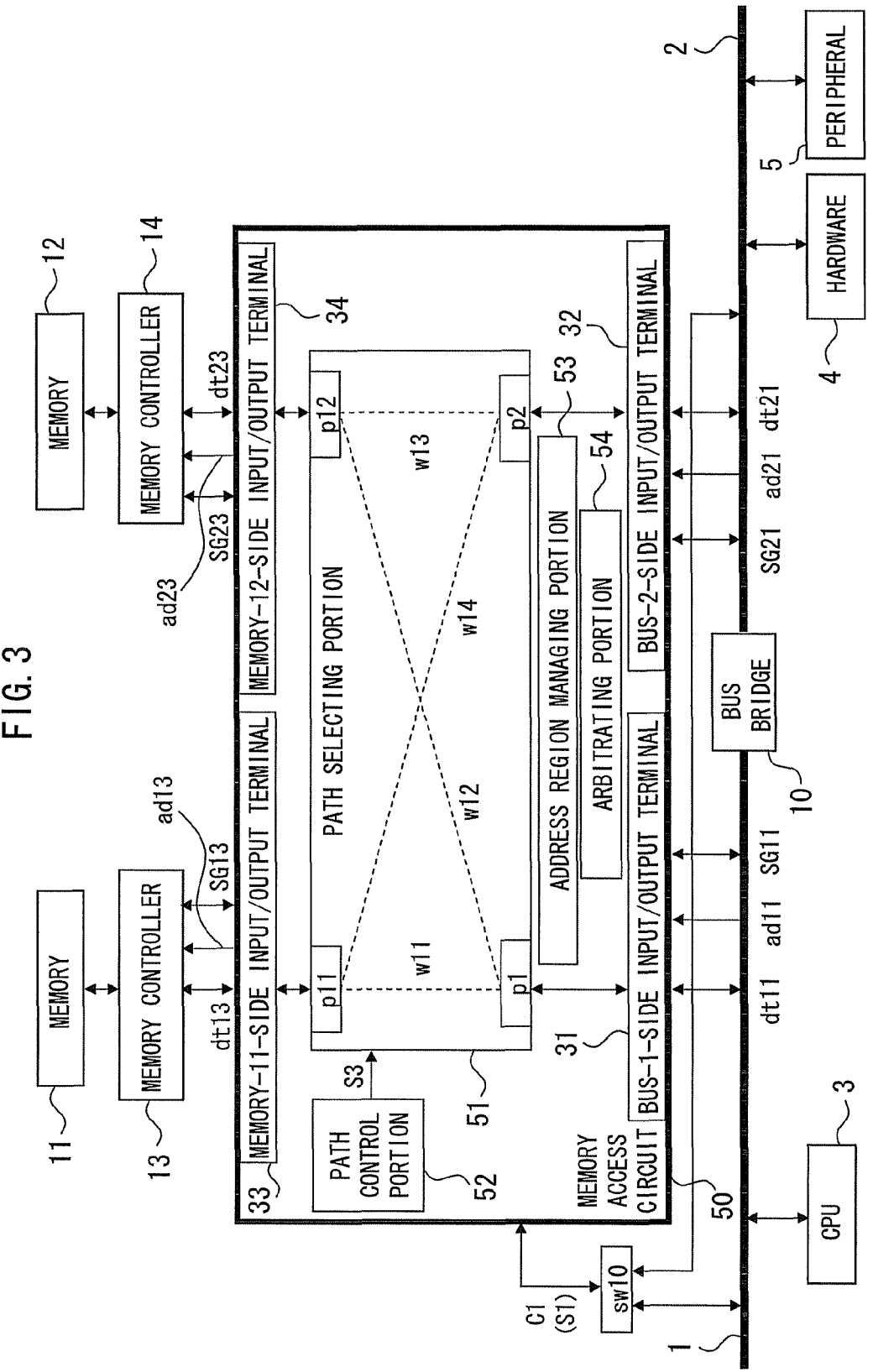
FIG. 3 is a schematic diagram of a system LSI according to a first embodiment.

FIG. 3 is a schematic diagram of a system LSI according to a first embodiment. The system LSI has plural devices, plural memories and plural buses, which is one exemplary form illustrated in FIG. 3. This embodiment is different from the system LSI in the past illustrated in FIG. 1 in that it has a memory access circuit 50 between buses 1 and 2 and memory controllers 13 and 14.

The system LSI has a first bus system including a CPU 3, for example, and a second bus system including hardware 4 such as an arithmetic circuit and a peripheral 5 such as an external interface and further has memories 11 and 12. The system LSI further has two buses 1 and 2. The bus 1 connects to the CPU 3, and the bus 2 connects to the hardware 4 and the peripheral 5. The buses 1 and 2 are connected by a bus bridge 10, and through the bus bridge 10, the data transfer between the buses is performed.

The memory access circuit 50 has a path selecting portion 51, a path control portion 52, an address region managing portion 53 and an arbitrating portion 54. The memory access circuit 50 is controlled by a circuit control signal C1 output by the CPU 3 or the hardware 4. A switch sw10 receives the circuit control signal C1 output from the first or second bus system and outputs it to the memory access circuit 50. The memory access circuit 50 further has bus-side input/output terminals 31 and 32 and memory-side input/output terminals 33 and 34, which are input/output interfaces for signals, on the buses 1 and 2 side and the memories 11 and 12 side, respectively. In the memory access circuit 50, the bus-1-side input/output terminal 31 connects to the bus 1, and the bus-2-side input/output terminal 32 connects to the bus 2. The memory-11-side input/output terminal 33 connects to a memory controller 13, and the memory-12-side input/output terminal 34 connects to a memory controller 14.

The cooperative functioning by the portions 51 to 54 allows signal transfer among the input/output terminals through the access paths w11 to w14 within the path selecting portion 51.

The memory 11 and memory 12 are assigned identical address spaces to be requested to access by the CPU 3 or other devices and are access-controlled by the memory controllers 13 and 14. The following description of this embodiment assumes that the memory 11 and the memory 12 have address spaces of 0x0000_0000 to 0x1FFF_FFFF. In other words, for memory access, the CPU 3 or another device designates an access destination address within the range of 0x0000_0000 to 0x1FFF_FFFF to the memory controller 13 or 14, and the memory controller 13 or 14 performs access control on the address.

The buses 1 and 2 are buses each having a data bus, an address bus and a control line. Signals to be transmitted and be received from the bus-1 side through the bus-1-side input/output terminal 31 are a data signal dt11, an address signal ad11 and an access control signal SG11. These signals may be transferred through the memory access circuit 50 to the memory-11-side input/output terminal 33 as the signals dt13, ad13 and SG13, respectively, for example. The same may be true for the signals to be transmitted and be received through the bus-2-side input/output terminal 32 and memory-12-side input/output terminal 34. The data signals dt11, dt21, dt13 and dt23 are data to be written or be read to or from a memory, and the address signals ad11, ad21, ad13 and ad23 are access destination addresses to the memories 11 and 12. The access control signals SG11, SG21, SG13 and SG23 are included in signals that control writing or reading for accessing the memories 11 and 12 by a device or signals to be used for access arbitration.

The path selecting portion 51 has terminals p1, p2, p11 and p12, which are signal input/output interfaces and access paths w11 to w14 between the buses 1 and 2 and the memories 11 and 12. Signals are transferred through the selected one or ones of the access paths w11 to w14 to the terminal p1, p2, p11 and p12. For example, if the path w12 is selected, the signals dt11, ad11 and SG11 input from the bus 1 to the bus-1-side input/output terminal 31 are output from the memory-12-side output terminal 34 through the terminal p1, the access path w12 and the terminal p12 in the path selecting portion 51 as the signals dt 23, ad23 and SG23. According to this embodiment, there are predetermined selection forms for access paths w11 to w14, including four path modes of a separate mode, a cross mode, a mirror mode and a one-all mode. In accordance with the path mode setting, the access path or paths w11 to w14 is or are selected. The details of the path modes will be described later.

The path control portion 52 controls the path selecting portion 51 so as to select the access path or paths w11 to w14. The path control portion 52 receives the path-selection-mode setting signal S1 indicating one of the path modes from the CPU 3 or hardware 4. Then, the path control portion 52 transmits path setting information S3 in accordance with the path-selection-mode setting signal S1 to the path selecting portion 51 for selecting the access path or paths w11 to w14 on the basis of the path mode and selects at least one of the access paths w11 to w14. In the one-all mode, the path control portion 52 selects one of the access paths w11 to w14 further on the basis of an input signal thereto from a device, which will be described later.

Figure 14:
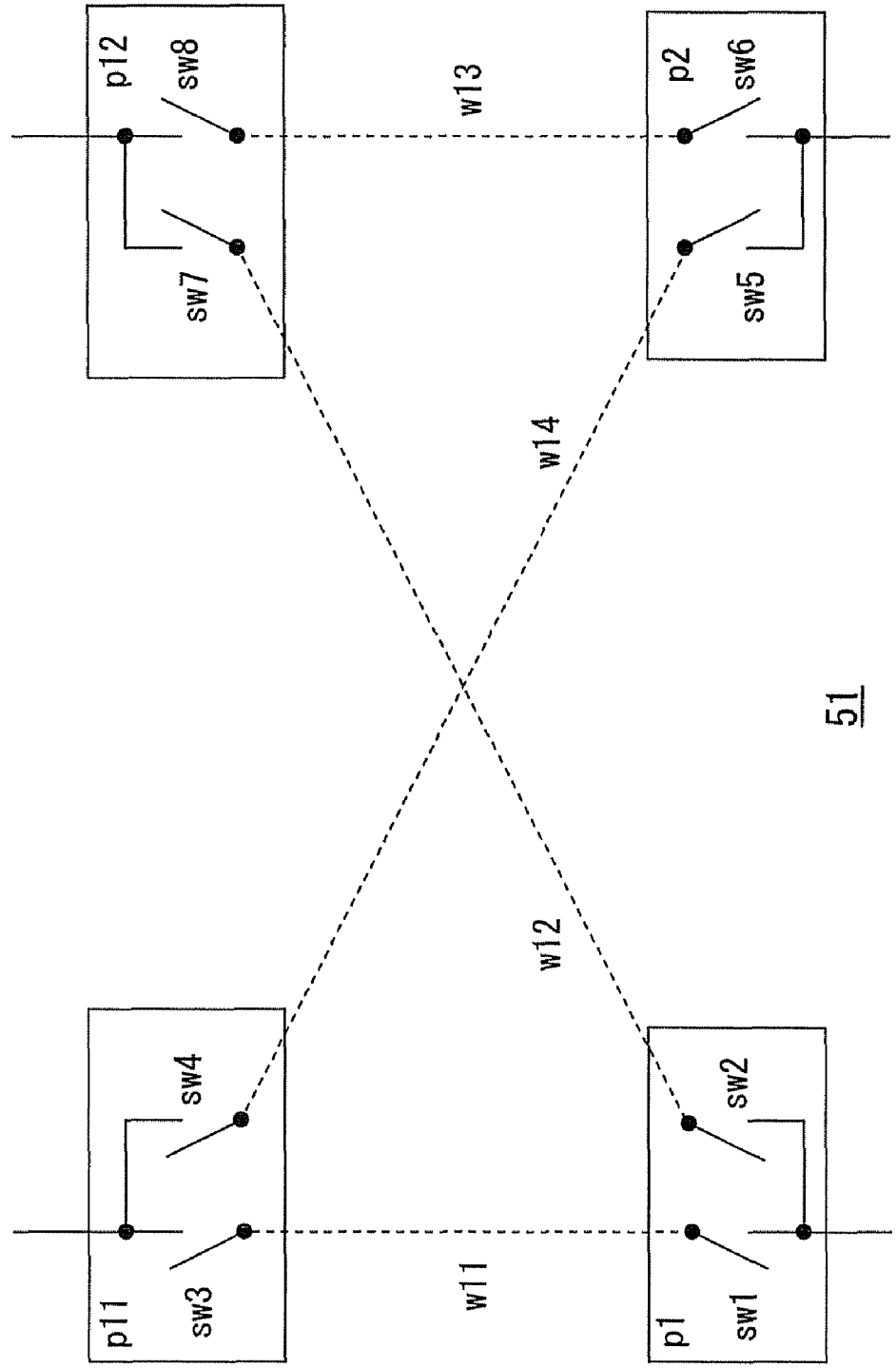
FIG. 14 is a configuration example of a path selecting portion.

FIG. 14 is a configuration example of the path selecting portion 51. As illustrated in FIG. 14, the terminals p1, p2, p11 and p12 may have switching circuits, and the access path or paths w11 to w14 may be selected in accordance with the switching. For example, when the path control portion 52 selects a switch sw1 in the terminal p1 and a switch sw3 in the terminal p11 by using a setting signal S3, the access path w11 in the path selecting portion 51 may be selected. In the same manner, when the path control portion 52 selects a switch sw2 in the terminal p1 and a switch sw7 in the terminal p12, the access path w12 in the path selecting portion 51 may be selected.

Like the buses 1 and 2, the access paths w11 to w14 have a parallel configuration. For example, referring again to FIG. 3, when the data signal dt11, address signal ad11 and access control signal SG11, which are signals received/transmitted from/to a device connecting to the bus 1, use a 32 bit length, a 32 bit length and a 3 bit length, respectively, each of the access paths w11 to w14 also includes 67 signal lines through which signals using a 67 bit length can be transferred in parallel.

The address region managing portion 53 receives address signals ad11 and ad21 from the bus-side input/output terminals 31 and 32, does not perform address conversion or performs address conversion thereon in accordance with the path-selection-mode setting signal S1 from the CPU 3 or hardware 4, and outputs them to the terminals p1 and p2 in the path selecting portion 51 as address signal ad12 and ad22. More specifically, if the path-selection-mode setting signal S1 indicates the separate mode, the cross mode or the mirror mode, the address conversion is not performed. If it indicates the one-all mode, the address conversion is performed. The details of the address managing section 53 will be described later.

The arbitrating portion 54 performs access arbitration processing if access requests occur from devices connecting to the bus-1 side and bus-2 side simultaneously to one same memory. The details of the arbitrating portion 54 will be described later.

Next, assuming the case where the path w11 is selected to write data from the CPU 3 to the memory 11, an operation example by the memory access circuit 50 will be described briefly. First of all, the CPU 3 outputs the data signal dt11, the address signal ad11 and the access control signal SG11 to the bus 1. Then, the arbitrating portion 54 receives the access control signal SG11, performs the arbitration processing thereon, and returns an access permission to the CPU 3. Then, the address region managing portion 53 receives the address signal ad11 and outputs it as an address signal ad12 to the terminal P1 in the path selecting portion 51. The address signal ad12 is output through the path w11 as an address signal ad13. The data signal dt11 is output through the path w11 as a data signal dt13. The memory controller 13 receives the address signal ad13 and the data signal dt13, and writes the data described by the data signal dt13 to the address indicated by the address signal ad13 in the memory 11.

[Operation Mode]

Next, the path modes will be described. As described above, there are predetermined selection forms for the access paths w11 to w14, including four path modes of the separate mode, cross mode, mirror mode and one-all mode.

The separate mode is a mode in which the access paths w11 and w13 are selected and signal transfer is performed between the bus 1 and the memory 11 and between the bus 2 and the memory 12. In other words, the separate mode is the same connection mode to a memory as that of the technology in the past in FIG. 1. Thus, the simultaneous access is allowed between the CPU 3 and memory 11 and the peripheral 5 and the memory 12.

The cross mode is a mode in which the access paths w12 and w14 are selected, and signal transfer is performed between the bus 1 and the memory 12 and between the bus 2 and the memory 11, respectively. So, since the CPU 3 accesses the memory 12 through the bus 1 and the access path w12, for example, the bus 2 is not occupied. Thus, when the CPU 3 accesses the memory 12, the peripheral 5 at the same time can access the hardware 4 or can access the memory 11 through the bus 2 and the access path w14.

The mirror mode is a mode in which all of the access paths w11 to w14 are selected. In the mode, the path selecting portion 51 transfers the signal input from the bus-1 side through the access paths w11 and w12 and transfers the signal input from the bus-2 side through the access paths w13 and w14. In this case, the access path w11 and the access path w14 are not connected in the terminal p11. For example, the signal transferred from the terminal p1 through the path w11 to the terminal p11 is not transferred through the path w14 to the terminal p2. The terminal p12 has the same configuration to the access paths w12 and w13. Thus, the device connecting to the buses 1 and 2 performs the same processing simultaneously on the memories 11 and 12. For example, when a device connecting to the bus-1 side issues an access request to a memory and when the address signal ad11 and the data signal dt11 are input from the bus 1 to the bus-1-side input/output terminal 31, the same signals are transferred from the terminal p1 in the path selecting portion 51 through the access paths w11 and w12 to the terminals p11 and p12. Then, the memory controllers 13 and 14 receive the input of the same signals, and the same data described by the data signal dt11 is written to the address corresponding to the address signal ad11 in the memories 11 and 12. Notably, in data reading, a device reads the data from one of the memories.

In order for a device connecting to the bus-1 side to access a memory, the access paths w11 and w12 may be selected. In order for a device connecting to the bus-2 side to access a memory, the access paths w13 and w14 may be selected. In this case, in accordance with which bus side that the device having issued the access request connects to, either access paths w11 and w12 or access paths w13 and w14 may be selected.

In the one-all mode, a device uses the two memories 11 and 12, which are physically separated and have the same address space, as one memory having one address space. As described above, the memory 11 and the memory 12 are assigned address spaces of 0x0000_0000 to 0x1FFF_FFFF, which are access-controlled by the memory controllers 13 and 14. However, in the one-all mode, the address region managing portion 53 manages the address spaces in the memory 11 as 0x0000_0000 to 0x1FFF_FFFF and the address spaces in the memory 12 as 0x2000_0000 to 0x3FFF_FFFF, which are continuous to the memory 11. Thus, a device uses the two memories 11 and 12 as one memory having address spaces of 0x0000_0000 to 0x3FFF_FFFF. In other words, in the one-all mode, the CPU 3 or other device designates an access destination address in the range of 0x0000 to 0000 to 0x3FFF_FFFF for memory access. Then, the address region managing portion 53 identifies the corresponding memory 11 or 12 from the access request destination address designated by the device, and the path control portion 52 selects the access paths w11 to w14 on the basis of the identification information.

According to this embodiment, the switching between the separate mode and the cross mode allows devices connecting to the buses to access both of the memories 11 and 12 without occupying plural buses. For example, in order for the CPU 3 to access the memory 11, the separate mode may be used. In order for the CPU 3 to access the memory 12, the cross mode may be used. Thus, the bus 2 is not occupied. Furthermore, the simultaneous accesses from the devices connecting to the buses to both of the memories 11 and 12 are also allowed. For example, in the separate mode, the simultaneous accesses may be allowed between the CPU 3 and the memory 11 and between the peripheral 5 and the memory 12. In the cross mode, the simultaneous accesses may be allowed between the CPU 3 and the memory 12 and between the peripheral 5 and the memory 11.

In addition, according to this embodiment, when two or more path modes as described above are provided and are switched there-between, the efficiency for processing relating to memory access can be increased thereby. For example, in the mirror mode, same data may be written to both of the memories 11 and 12. After that, in the separate mode, the CPU 3 and the peripheral 5 may read the data from the memory 11 and the memory 12. Thus, the CPU 3 and the peripheral 5 can use the same data to perform simultaneous and parallel processes.

[Detailed Operations and Signal Transfer]

Figure 4:
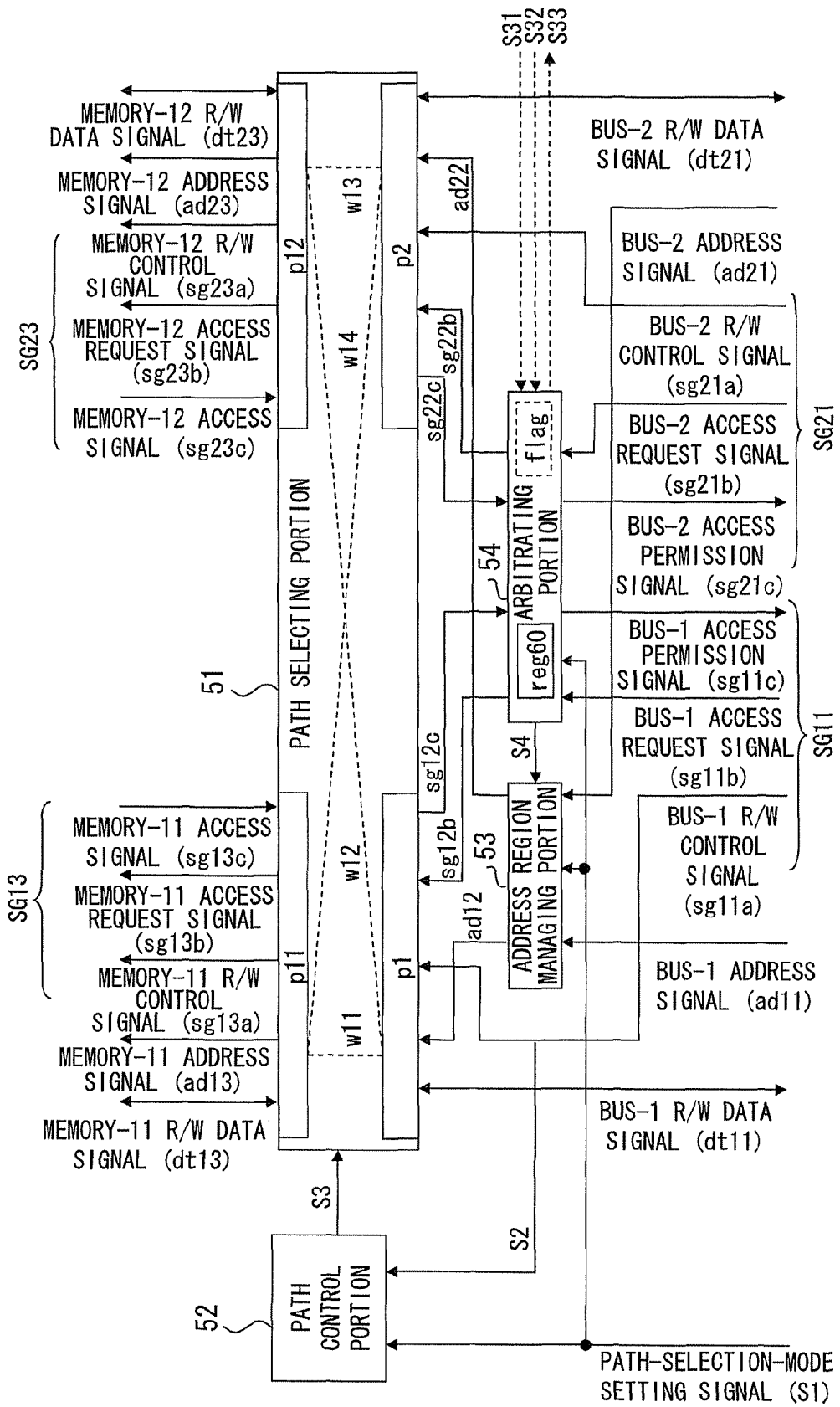
FIG. 4 is a block diagram of signal flows within a memory access circuit.

Next, with reference to FIG. 3 and FIG. 4, signal flows and operations by the components according to this embodiment will be described in detail. FIG. 4 is a block diagram of signal flows within the memory access circuit 50. The same reference numerals are given to the parts corresponding to those in FIG. 3. Each of the "BUS-1", "BUS-2", "MEMORY-11" and "MEMORY-12" before a signal name illustrated in FIG. 4 indicates an access request source or a request destination, which will be partially omitted in the following descriptions. In other words, the "bus-1 R/W data signal dt11 and bus-2 R/W data signal dt21" will be written as "R/W data signals dt11 and dt12".

Under the operation control by the system LSI, the CPU 3 controls the memory access circuit 50 and other devices connecting to the buses. First of all, the path mode of the memory access circuit 50 is set by the CPU 3. After the path mode is set, the CPU 3 issues to the devices a command for processing relating to an access to a memory. Then, the devices in response to the command start accessing the memories 11 and 12. The path mode is changed after all processes being performed in the path mode end. In other words, while one device is accessing a memory in one path mode, the CPU 3 or hardware 4 does not set the switching to another path mode. For example, in order for the hardware 4 connecting to the bus-2 side to access the memory 11 in the cross mode, the CPU 3 first transmits a path-selection-mode setting signal S1 to the memory access circuit 50 and sets the paths for the cross mode. Next, the CPU 3 transmits a command for memory access processing to the hardware 4. The hardware 4 in response to the command starts accessing the memory 11. After completing the memory access processing, the hardware 4 notifies the CPU 3 of the completion of the processing. After receiving the notification, the CPU 3 may change the path mode of the memory access circuit 50. Notably, the CPU 3 may recognize the completion of the memory access processing by the hardware 4 under program control.

The R/W control signals sg11a and sg21a on the bus side are signals indicating whether data is to be written to the memories 11 and/or 12 or data is to be read from the memories 11 and/or 12 and are output through the access paths w11 to w14 in the path selecting portion 51 to the memory side as R/W control signals sg13a and sg23a. The memory controllers 13 and 14 in response to the R/W control signals sg13a and sg23a determine whether data is to be written to the memories 11 and 12 or data is read from the memories 11 and/or 12. The R/W data signals dt11 and dt21 on the bus side are the data that the device writes to the memories 11 and 12 or reads from the memories 11 and 12. In other words, in order to write data to the memories 11 and/or 12, the R/W data signals dt11 and dt21 on the bus side are output through the access paths w11 to w14 in the path selecting portion 51 to the memory side as the R/W data signals dt13 and dt23. In order to read data from the memories 11 and 12, the R/W data signals dt13 and dt23 on the memory side are output through the access paths w11 to w14 in the path selecting portion 51 to the bus side as the R/W data signals dt11 and dt21.

Though the path-selection-mode setting signal S1 is a signal for setting the path mode to be output by the CPU 3 or hardware 4 in FIG. 3 as described above, the path-selection-mode setting signal S1 is also transmitted to the address region managing portion 53 and the arbitrating portion 54. In response to the path-selection-mode setting signal S1, the corresponding portions operate.

[Address Region Managing Portion]

The address region managing portion 53 does not perform address conversion or performs address conversion on the address signal ad11 input from a device connecting to the bus-1 side in accordance with the path-selection-mode setting signal S1 and outputs it as the address signal ad12 to the terminal p1 in the path selecting portion 51. The address signal ad12 is output as the address signal ad13 or ad23 through the selected access path w11 or access path w12 to the memory controller 13 or 14. In the same manner, the address region managing portion 53 outputs the address signal ad21 input from a device connecting to the bus-2 side to the terminal P2 in the path selecting portion 51 as the address signal ad22. Then, the address signal ad22 is output as the address signal ad13 or ad23 through the access path w13 or access path w14, which is selected in the same manner, to the memory controllers 13 and 14.

Figure 5:
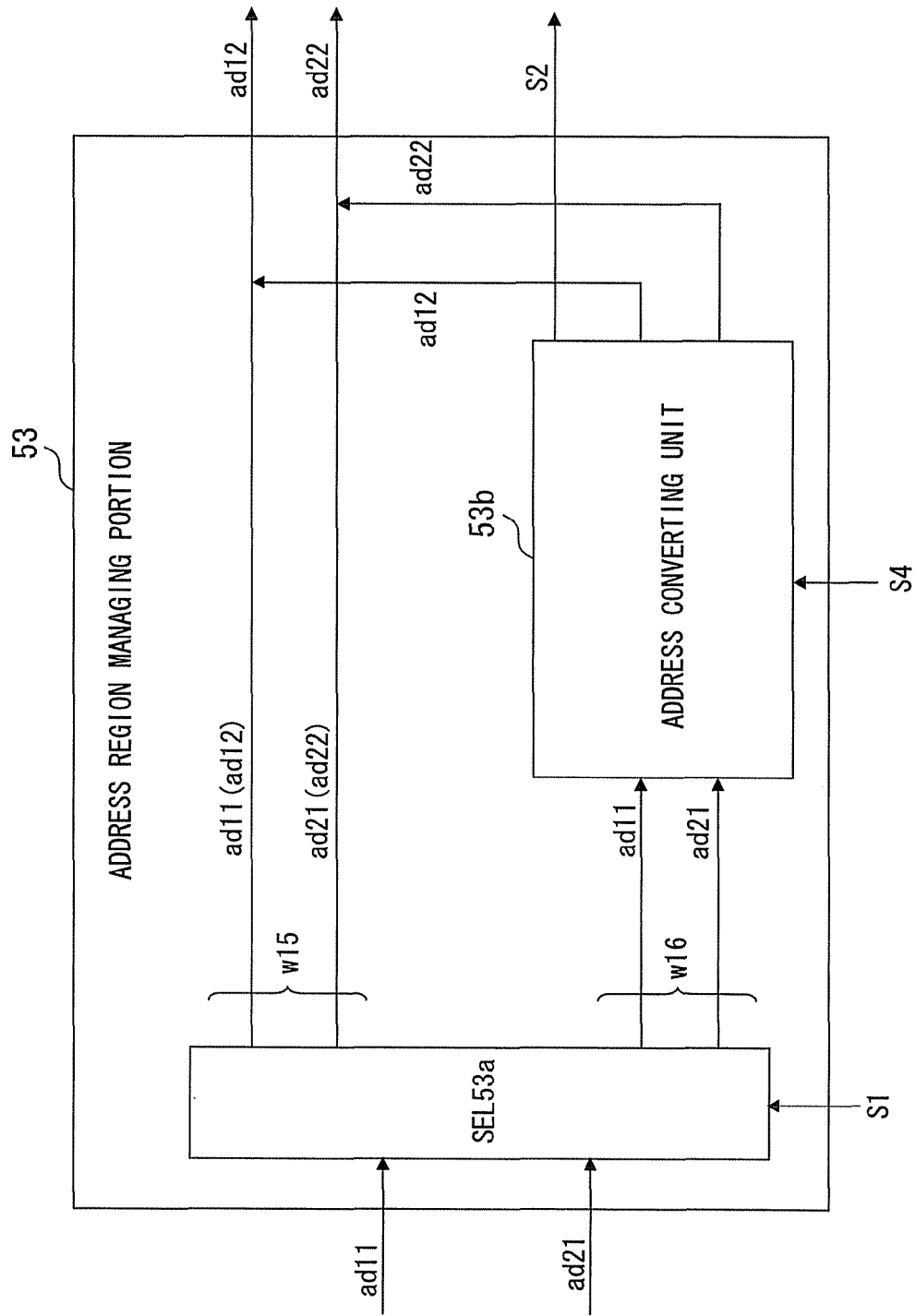
FIG. 5 is a block diagram of an address region managing portion.

FIG. 5 is a block diagram of the address region managing portion 53. The address region managing portion 53 has a selector 53a and an address converting unit 53b. The selector 53a selects the path w15 or path w16 in accordance with the path-selection-mode setting signal S1 and outputs the input address signals ad11 and ad21. According to this embodiment, when the path-selection-mode setting signal S1 indicates the separate mode, the cross mode or the mirror mode, the selector 53a selects the path w15. When it indicates the one-all mode, the selector 53a selects the path w16. The address converting unit 53b further performs predetermined address conversion on the input address signals ad11 and ad21.

In the separate mode, cross mode or mirror mode, the devices access destination addresses in the range of 0x0000_0000 to 0x1FFF_FFFF, which are address spaces of the memories 11 and 12, for memory access. This may eliminate the necessity for the address conversion, and the address region managing portion 53 outputs the input address signals ad11 and ad21 as the address signals ad12 and ad22 as they are. In other words, the address region managing portion 53 does not perform the address conversion in the separate mode, cross mode or mirror mode.

In the one-all mode, as described above, the devices handle the two memories 11 and 12 as one memory having address spaces of 0x0000_0000 to 0x3FFF_FFFF. Thus, the devices designate an access destination address in the range of 0x0000_0000 to 0x3FFF_FFFF, for memory access. However, the address spaces assigned to the memories 11 and 12 under the access control by the memory controllers 13 and 14 are 0x0000_0000 to 0x1FFF_FFFF. So, the address region managing portion 53 converts the access destination addresses designated by the devices in the one-all mode to the addresses assigned to the memories 11 and 12. In other words, in the one-all mode, the address signals ad11 and ad21 input to the address region managing portion 53 undergo the address conversion through the address converting unit 53b to the addresses assigned to the memories 11 and 12, which are then output as the address signals ad12 and ad22.

The access destination address designated by the CPU 3 or another device will be called CPU address, and the designated range will be called CPU address space, hereinafter. The address space assigned to the memory 11 or 12 under the access control by the memory controller 13 or 14 will be called memory address space, and the corresponding address will be called memory address, hereinafter.

Figure 6:
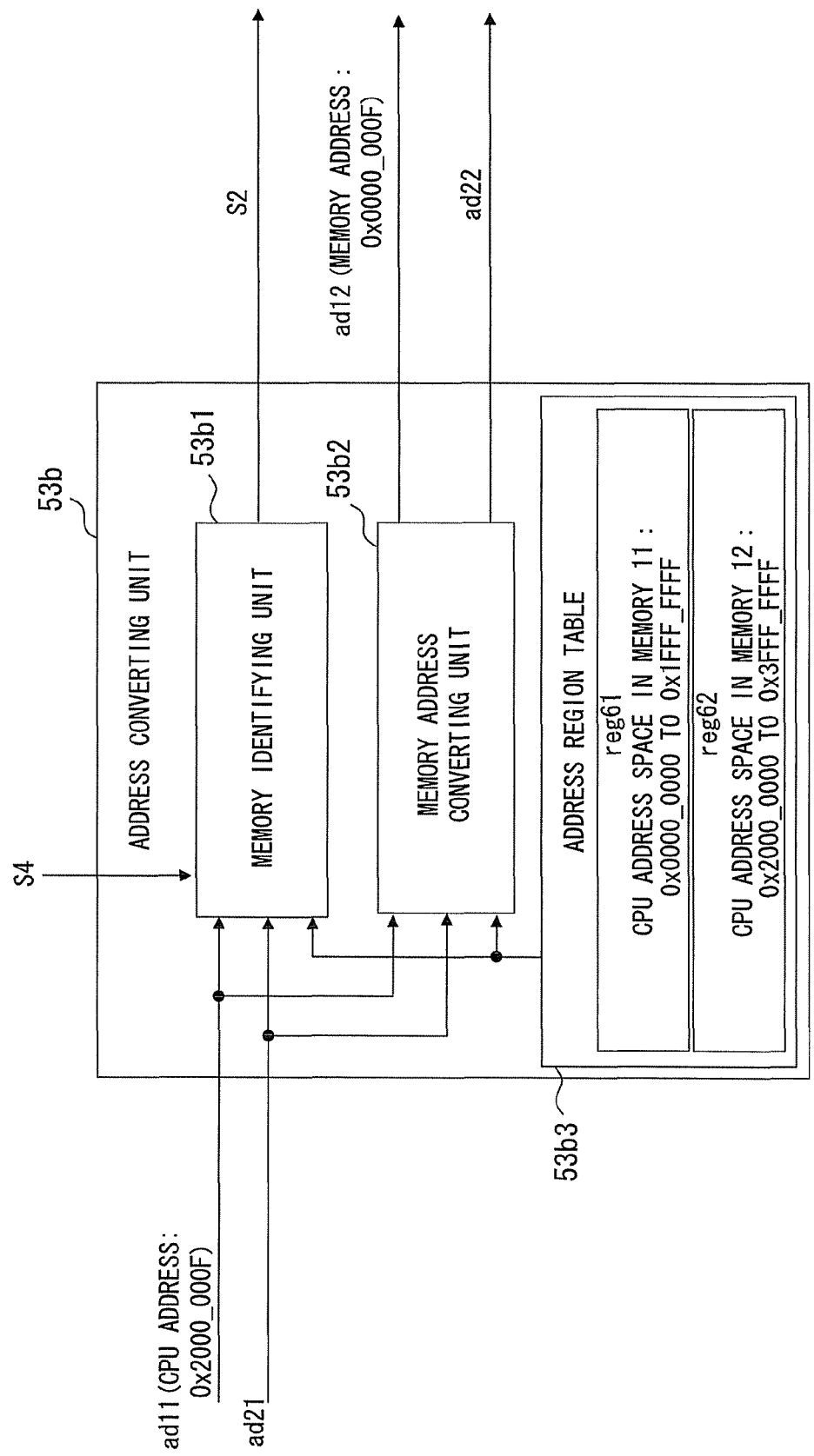
FIG. 6 is a block diagram of an address converting unit.

FIG. 6 is a block diagram of the address converting unit 53b. The address converting unit 53b has a memory identification unit 53b1, a memory address converting unit 53b2 and an address region table 53b3. The address signal ad11 or ad21 to be input indicates a CPU address in the one-all mode. The address signal ad12 or ad22 to be output indicates the memory address after the address conversion.

The address region table 53b3 has registers reg61 and reg62 that hold a CPU address spaces in the one-all mode in the memories 11 and 12. The register reg61 indicates the CPU address space in the memory 11, and the register reg62 indicates the CPU address space in the memory 12. In other words, the register reg61 has values indicating 0x0000_0000 to 0x1FFF_FFFF, and the register reg62 has values indicating 0x2000_0000 to 0x3FFF_FFFF, which are continuous to those of the CPU address spaces of the memory 11. Those values are set by the CPU 3.

The memory identification unit 53b1 refers to the registers reg61 and reg62 on the address region table 53b3, identifies which has the address indicated by the input CPU address signal ad11 or ad12 between the memory 11 and the memory 12, and handles it as memory identification information. The memory identification unit 53b1 further receives from the arbitrating portion 54 a bus identification signal S4 indicating either bus 1 or bus 2 that the device having issued the memory access request connects to. Then, the memory identification unit 53b1 outputs the memory identification signal S2 having the memory identification information and the bus identification information to the path control portion 52.

In the one-all mode, the path control portion 52 selects one of the access paths w11 to w14 on the basis of the memory identification information and bus identification information of the memory identification signal S2. So, when the bus identification information indicates the bus 1, the path control portion 52 selects the path w11 or path w12 in accordance with the memory identification information. When the bus identification information indicates the bus 2, the path control portion 52 selects the path w13 or path w14 in accordance with the memory identification information.

According to this embodiment, the bus identification information and the memory identification information are combined by the address region managing portion 53 into the one memory identification signal S2. However, the arbitrating portion 54 may directly output the bus identification signal S4 to the path control portion 52, and the memory identification signal S2 output by the address region managing portion 53 may be a signal only having the memory identification information. Also in this case, the path control portion 52 can acquire the memory identification information and bus identification information and can select one of the access paths w11 to w14.

The memory address converting unit 53b2 refers to the address region table 53b3 and performs the address conversion on the CPU address signal ad11 or ad21 to the memory address signal ad12 or ad22. As described above, the CPU address space has the address spaces of the memory 12 continuously to the address spaces of the memory 11. Thus, the CPU address spaces and memory address spaces agree in the memory 11, while a CPU address space in the memory 12 is the result of the addition of a memory address space in the memory 12 to the corresponding memory address space in the memory 11. In other words, when the input CPU address signal ad11 or ad21 is within the range of the CPU address spaces of the memory 12, which is indicated by the register reg62, the memory address converting unit 53b2 subtracts 0x2000_0000 from the address indicated by the input CPU address signal ad11 or ad21, as the address conversion.

Next, operation examples by the address region managing portion 53 in the one-all mode will be described. As illustrated in FIG. 6, when the bus-1 side inputs 0x2000_000F as the CPU address signal ad11, the memory identification unit 53b1 refers to the address region table 53b3 and identifies that the address indicated by the CPU address signal ad11 is within the address spaces of the memory 12. The memory identification unit 53b1 further receives the bus identification signal S4 from the arbitrating portion 54 and outputs the memory identification signal S2 to the path control portion 52. The memory identification signal S2 has information that the access request has been issued from the bus-1 side to the memory 12. So, the path control portion 52 selects the path w12 in accordance with the memory identification signal S2. The real memory address converting unit 53b2 subtracts 0x2000_0000 from 0x2000_000F indicated by the CPU address signal ad11 to convert it to 0x0000_000F and outputs the result as the memory address signal ad12. Then, the converted memory address signal ad12 is output to the terminal p1 in the path selecting portion 51 and is input through the path w12 selected by the path control portion 52 to the memory controller 14 on the memory 12 side as the address signal ad23. Then, the memory controller 14 accesses the address in the memory 12, which corresponds to the address signal ad23.

Alternatively, as described above, in the mirror mode, the access paths w11 and w12 may be selected in accordance with the access request from the bus-1 side, and the access path w13 and w14 may be selected in accordance with the access request from the bus-2 side. In this case, the selection of one of the access paths w11 to w14 is managed by the address region managing portion 53, as in the one-all mode. Since the path mode is the mirror mode, the selector 53a in the address region managing portion 53 selects the path w15 as described above, and the address region managing portion 53 does not perform the address conversion. Then, the address converting unit 53b in the address region managing portion 53 receives the bus identification signal S4 from the arbitrating portion 53 and outputs the memory identification signal S2 only having the bus identification information to the path control portion 52. The path control portion 52 identifies either memory access request from the bus-1 side or memory access request from the bus-2 side in accordance with the memory identification signal S2. If the memory access request is issued from the bus-1 side, the access paths w11 and w12 are selected. If the memory access request is issued from the bus-2 side, the access paths w13 and w14 are selected.

The address converting unit 53b illustrated in FIG. 6 has two inputs allowing the address conversion on both of the bus-1 side address signal ad11 and the bus-2 side address signal ad21 but may be replaced by two address converting units each having one input with the same function as that of the address converting unit 53b.

[Arbitrating Portion]

The arbitrating portion 54 performs access arbitration processing on a memory when devices connecting to different buses simultaneously issue requests to access the memory. Here, the bus arbitration between the devices connecting to one same bus is typically performed by the CPU 3, for example, excluding the arbitrating portion 54. So, while one device is using one bus, another device connecting to the same bus does not acquire the bus right and does not issue the request to access a memory. As described above, the path mode is set by the CPU 3 or hardware 4. So, while one device is accessing a memory in one path mode, the CPU 3 or hardware 4 does not change the setting to another path mode.

Referring back to FIG. 4, the arbitrating portion 54 has a path mode register reg60 that stores the path mode being set. The value in the path mode register reg60 is rewritten by the path-selection-mode setting signal 51 received by the arbitrating portion 54. The arbitrating portion 54 refers to the value in the path mode register reg60 to identify the set path mode.

The arbitrating portion 54 further receives access signals sg13c and sg23c as signals sg12c and sg22c from the memory controllers 13 and 14 through the access paths w11 to w14 in the path selecting portion 51. The access signals sg13c and sg23c are busy signals and indicate a busy state when devices are accessing the memories 11 and 12.

The access request signals sg11b and sg21b are signals to be transmitted when devices access memories. The arbitrating portion 54 in response to the access request signals sg11b and sg21b from devices first refers to the path mode register reg60 and identifies the set path mode. Then, the arbitrating portion 54 determines whether the memory access by the devices is allowed or not in accordance with the set path mode and the access signals (busy signals) sg12c and sg22c. When no conflicts occur in access to one memory, access permission signals sg11c and sg21c are transmitted to the devices.

Next, a concrete example of the method for arbitrating access requests from devices to a memory will be described below. As described above, the arbitration over the buses 1 and 2 is performed separately on the devices connecting to the buses 1 and 2. So, the devices having transmitted the access request signals sg11b and sg21b already acquire the usage right of the bus 1 and bus 2 and occupy the corresponding buses. As a result, in the separate mode or cross mode in which the buses 1 and 2 and the memories 11 and 12 are connected through one path, devices connecting the same buses 1 and 2 as those of the devices accessing the memories do not output the access request signals sg11b and sg21b. In other words, a different device connecting to the unused one of the buses 1 and 2 only outputs the access request signal. Accordingly, the arbitrating portion 54 in response to the access request signals sg11b and sg21b from devices first refers to the path mode register reg60. Then, when the set path mode is the separate mode or the cross mode, the access signals (or busy signal) sg12c and sg22c do not indicate the busy state. So, without reference to it, the access permission signals sg11c and sg21c are transmitted to the devices to permit the access.

When the path mode is the mirror mode, a device accesses both of the memories simultaneously. In the one-all mode, a device accesses both of the memories as a single memory. Furthermore, as described above, because of the bus arbitration, devices connecting to the buses 1 and 2 as the devices connecting to the same buses 1 and 2 and accessing the memories do not output the access request signals sg11b and sg21b. So, the arbitrating portion 54 in response to the access request signals sg11b and sg21b first refers to the path mode register reg60. When the set path mode is the mirror mode or the one-all mode, the arbitrating portion 54 further refers to the access signals (or busy signals) sg12c and sg22c for the memories 11 and 12. When both of the access signals (or busy signals) sg12c and sg22c do not indicate the busy state, the arbitrating portion 54 transmits the access permission signals sg11c and sg21c to the devices to permit the access. On the other hand, when at least one of the access signals (or busy signals) sg12c and sg22c indicates the busy state, the arbitrating portion 54 inhibits the memory access by another device and puts the device to an access waiting state. Then, when the busy state of the access signals (or busy signals) sg12c and sg22c is cancelled, the arbitrating portion 54 issues the access permission to the device in the access waiting state.

The arbitrating portion 54 further outputs the access request signals sg11b and sg21b as the signals sg12b and sg22b. The signals sg12b and sg22b are input through the access paths w11 to w14 in the path selecting portion 51 to the memory controllers 13 and 14 as the access request signals sg13b and sg23b. The memory controllers 13 and 14 in response to the access request signals sg13b and sg23b switch the access signals (or busy signals) sg13c and sg23c to the busy state and control the signals to be transmitted over the access to the memories 11 and 12.

The arbitrating portion 54 further in response to the access request signals sg11b and sg21b identifies either bus 1 or 2 that has issued the access request and outputs the result as the bus identification signal S4 to the address region managing portion 53.

Next, the entire signal flow will be described with reference to the example that the access paths w12 and w14 are selected in the cross mode, while the CPU 3 writes data to the memory 11 in the separate mode. The CPU 3 does not change the setting to the separate mode when another device is in memory access under the setting of the cross mode and waits until the processing ends. In response to the notification of the completion of the processing from the device and after all processing ends in the cross mode, the CPU 3 transmits the path-selection-mode setting signal S1 to the memory access circuit 50 and sets the path mode to the separate mode. As a result, the access paths w11 and w13 are selected. The value of the path mode register reg60 within the arbitrating portion 54 is changed to the value indicating the separate mode.

The CPU 3 transmits the R/W data signal dt11, R/W control signal sg11a, address signal ad11 and access request signal sg11b to the bus 1.

In response to the access request signal sg11b, the arbitrating portion 54 refers to the path mode register reg60. Since the value of the path mode register reg60 indicates the separate mode, the arbitrating portion 54 transmits the access permission signal sg11c to the CPU 3 without reference to the access signal (or busy signal) sg12c for the memory 11. The arbitrating portion 54 further transmits the access request signal sg13b (sg12b) through the path w11 to the memory controller 13. Then, the memory controller 13 in response to the access request signal sg13b changes the access signal sg13c (or sg12c) to the busy state.

The address region managing portion 53 receives the address signal ad11 and transmits the address signal ad13 (or ad12) to the memory controller 13 without performing the address conversion because the path-selection-mode setting signal S1 indicates the separate mode. The R/W data signal dt11 and R/W control signal sg11a are transmitted as the R/W data signal dt13 and R/W control signal sg13a through the path w11 to the memory controller 13.

The memory controller 13 determines that the access is to write to the memory 11 on the basis of the R/W control signal sg13a and writes the data described by the R/W data signal dt11 to the address indicated by the address signal ad13 in the memory 11. Then, since the CPU 3 is permitted to access from the arbitrating portion 54, the CPU 3 transmits the subsequent signals to the memory 11.

OPERATION EXAMPLES

Next, the concept of this embodiment will be described with reference to drawings.

[Separate Mode]

Figure 7:
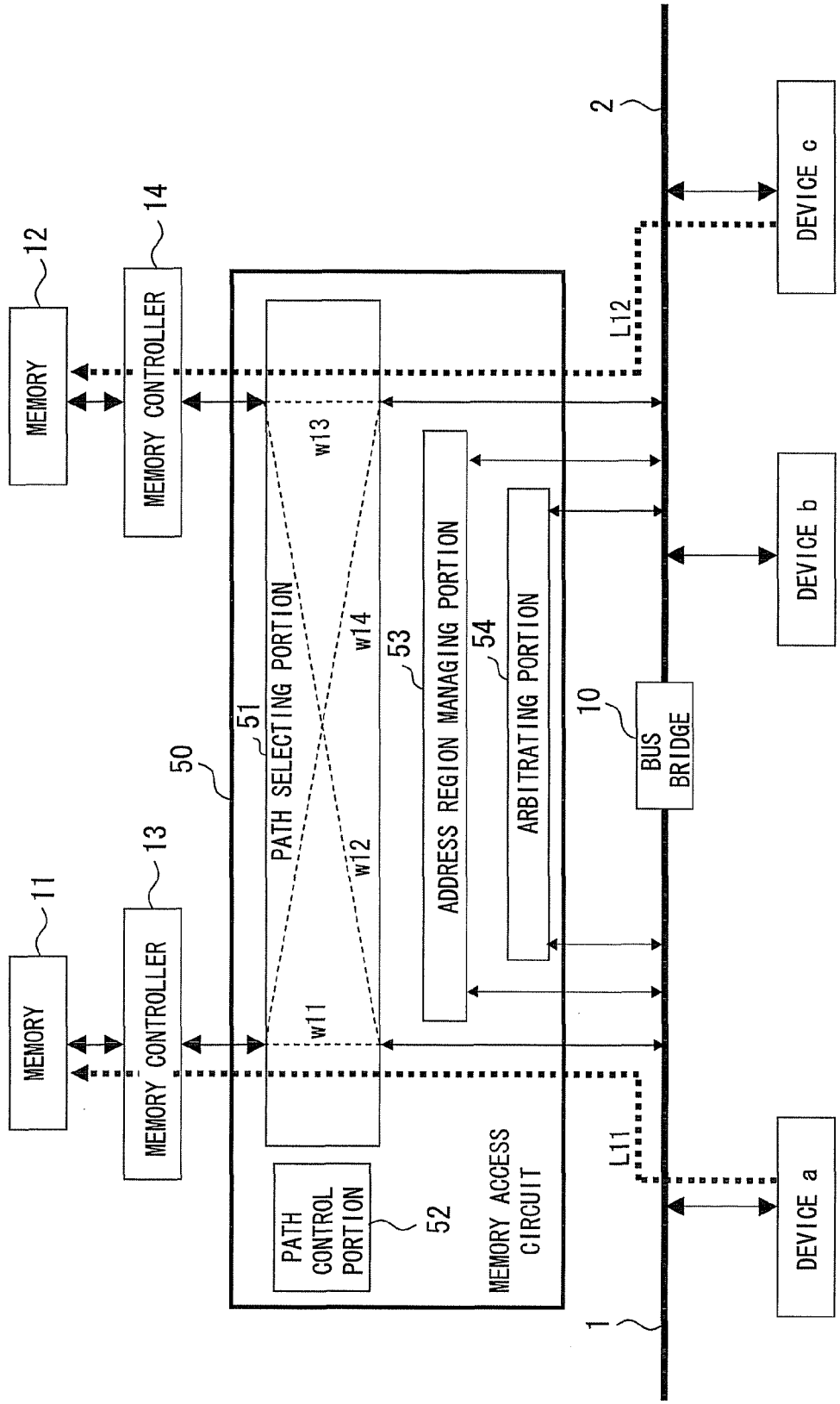
FIG. 7 is a schematic diagram of an operation in a separate mode.

FIG. 7 is a schematic diagram of an operation in the separate mode. In the separate mode, the path selecting portion 51 is selecting the paths w11 and w13. The paths L11 and L12 indicated by the illustrated thick broken lines are the signal-transfer path when devices a and c are accessing the memories 11 and 12. FIG. 7 illustrates the state in which the access by the device a through the path L11 to the memory 11 and the access by the device c through the path L12 to the memory 12 are being performed simultaneously. In other words, since the device a does not occupy the bus 2 while accessing the memory 11, the device c can occupy the bus 2 and access the memory 12. The device c can further access through the bus 2 to a device b.

[Cross Mode]

Figure 8:
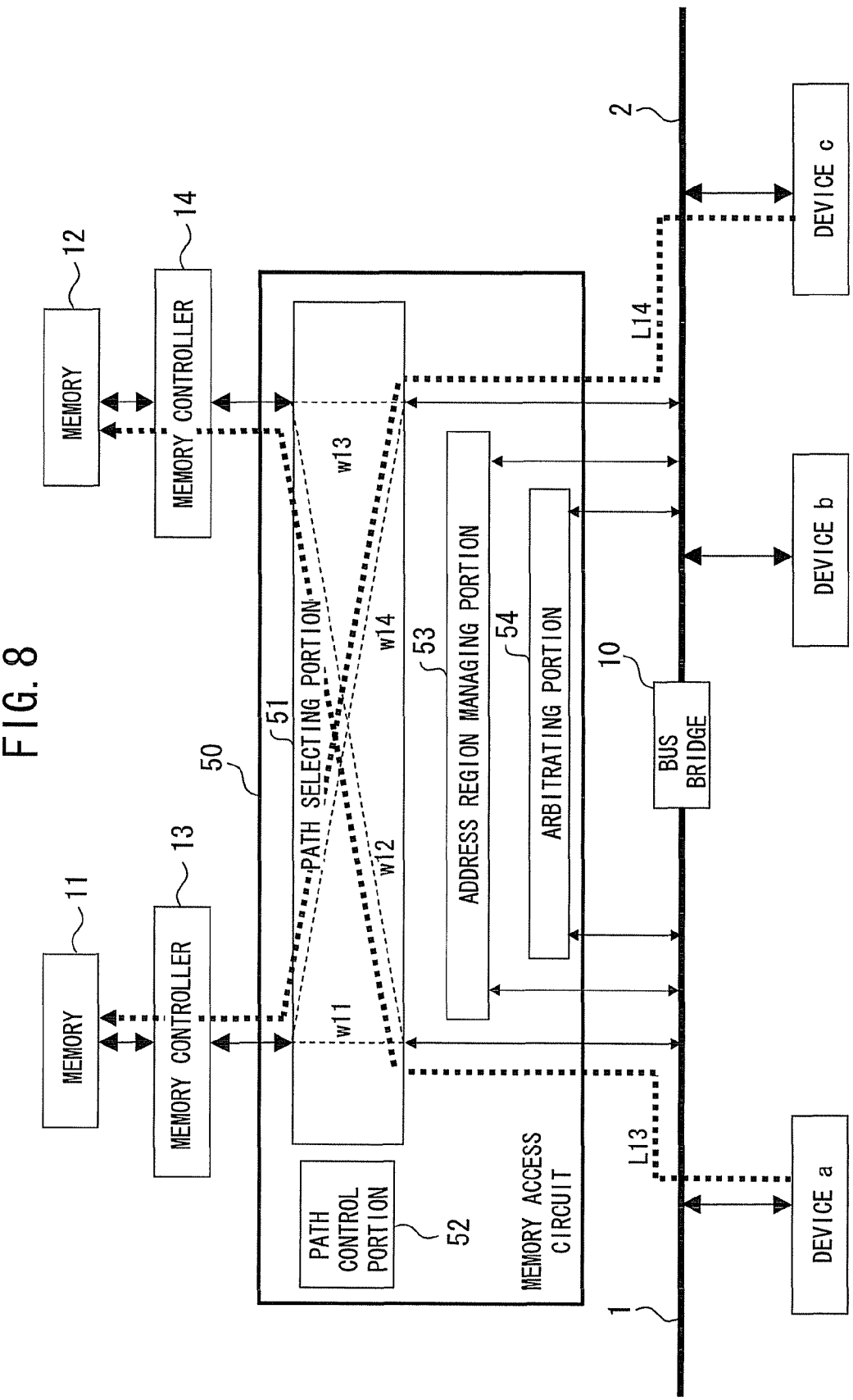
FIG. 8 is a schematic diagram of an operation in a cross mode.

FIG. 8 is a schematic diagram of an operation in the cross mode. In the cross mode, the path selecting portion 51 is selecting the paths w12 and w14. The paths L13 and L14 indicated by the illustrated thick broken lines are the signal-transfer path when devices a and c are accessing the memories 12 and 11. FIG. 8 illustrates the state in which the access by the device a through the path L13 to the memory 12 and the access by the device c through the path L14 to the memory 11 are being performed simultaneously. In other words, since the device a does not occupy the bus 2 while accessing the memory 12, the device c can occupy the bus 2 and access the memory 11. The device c can further access a device b through the bus 2.

[Mirror Mode]

Figure 9:
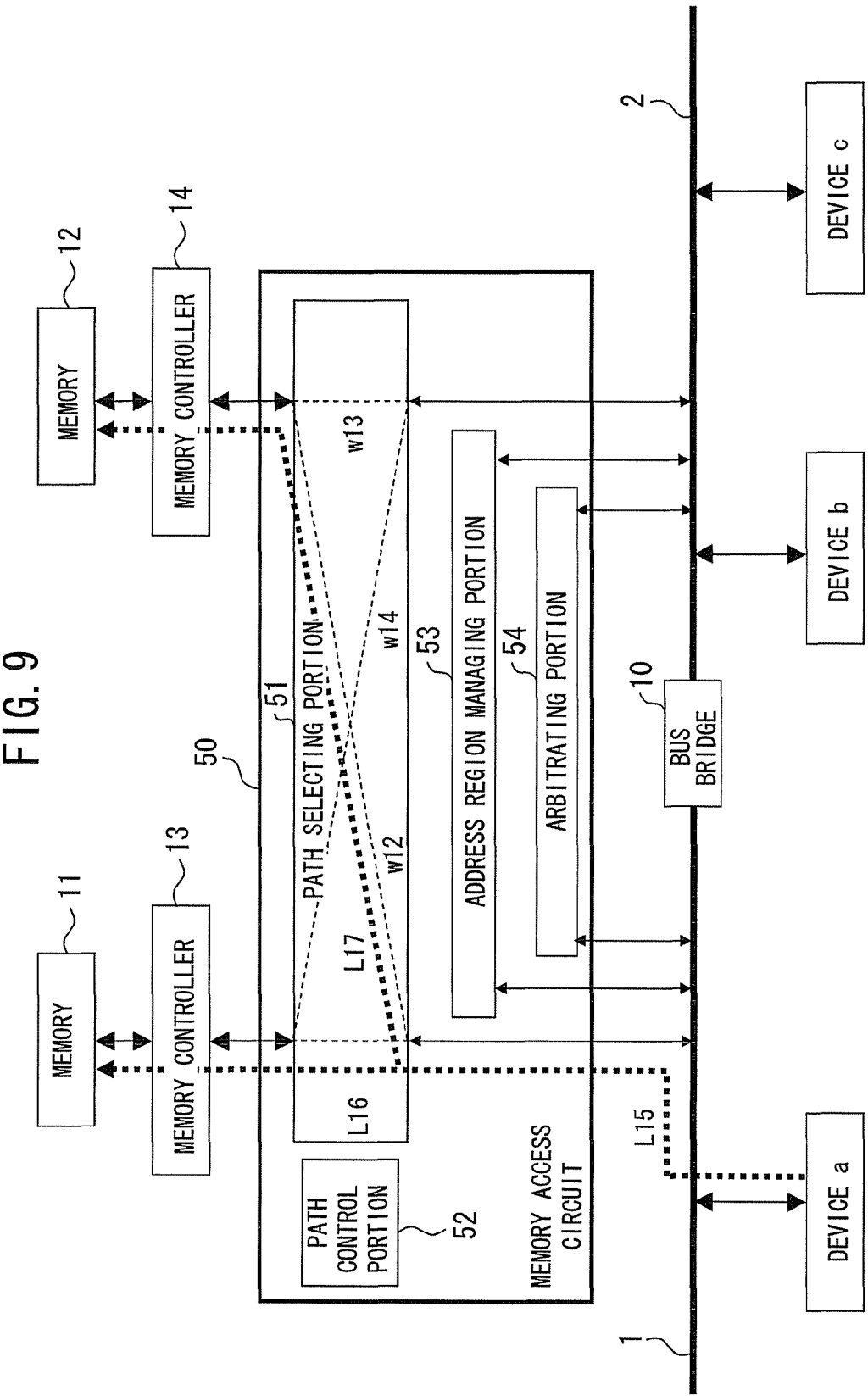
FIG. 9 is a schematic diagram of an operation in a mirror mode.

FIG. 9 is a schematic diagram of an operation in the mirror mode. In the mirror mode, the path selecting portion 51 is selecting the paths w11 to w14. The paths L15, L16 and L17 indicated by the illustrated thick broken lines are the signal-transfer paths when the device a is accessing the memories 11 and 12. The signal output from the device a passes through the path L15 and is separated in the path selecting portion 51 into the paths L16 and L17. The separated signals are output simultaneously to the memory 11 and the memory 12. In other words, the same memory access processing is performed on the same addresses in the memories 11 and 12. Notably, since the bus 2 is released while the device a is accessing the memories 11 and 12, the device c can occupy the bus 2 and can access the device b.

[One-All Mode]

Figure 10:
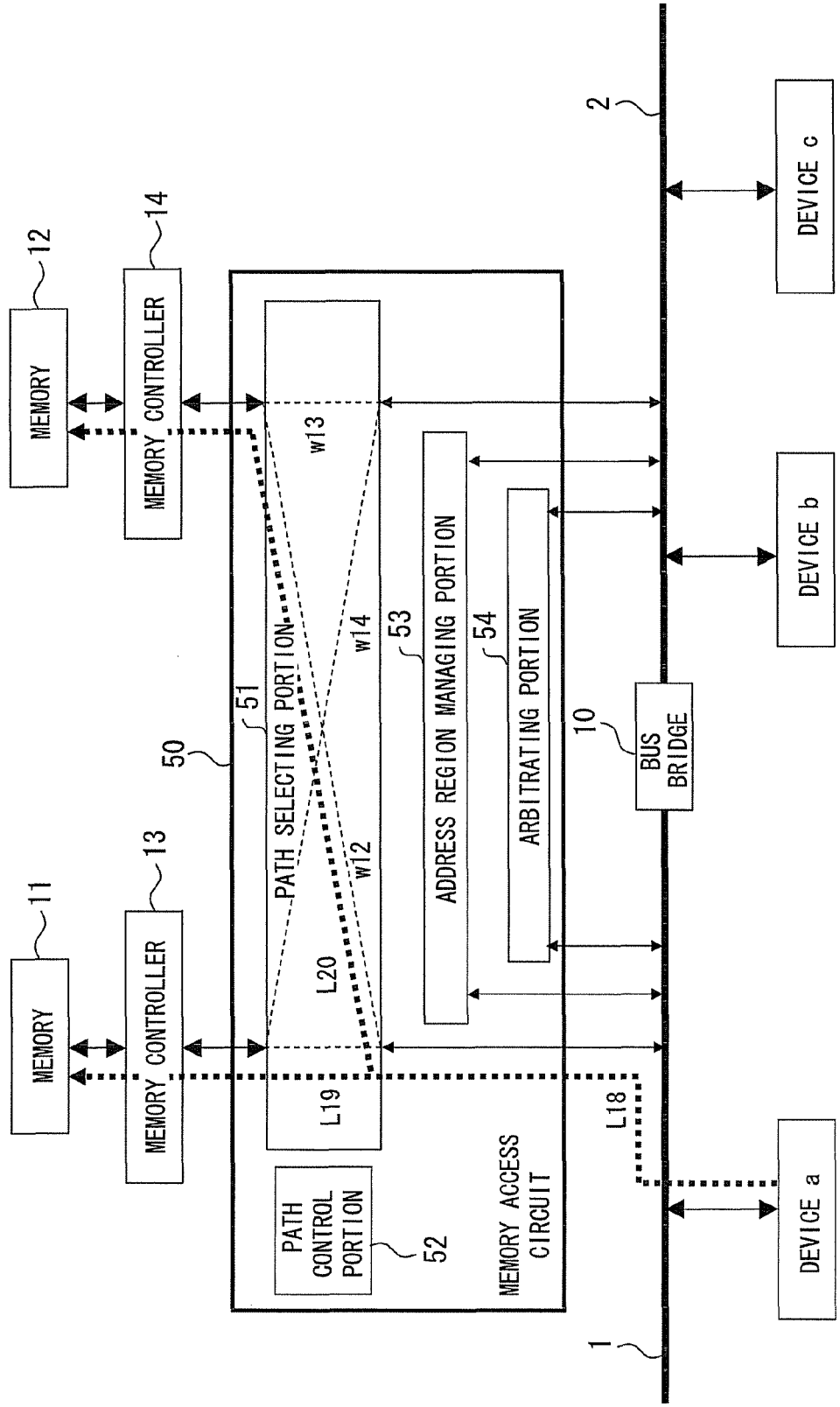
FIG. 10 is a schematic diagram of an operation in a one-all mode.

FIG. 10 is a schematic diagram of an operation in the one-all mode. In the one-all mode, the path selecting portion 51 selects one of the paths w11 to w14. The paths L18 and L19 indicated by the illustrated thick broken lines are signal-transfer paths when the device a is accessing the memory 11, and the paths L18 and L20 indicated by the illustrated thick broken lines are the signal-transfer path when the device a is accessing the memory 12. The address region managing portion 53 identifies either memory 11 or memory 12 that has the CPU address transmitted by the device a and performs the address conversion on the corresponding memory address. Then, on the basis of the memory identification information, the path control portion 52 selects the access path w11 or w12 in the path selecting portion 51. The device a accesses the memory 11 through the paths L18 and L19 or the memory 12 through the paths L18 and L20. Notably, since the bus 2 is not occupied while the device a is accessing the memory 11 or memory 12, the device c can occupy the bus 2 and can access the device b.

[Operations in Arbitration]

Figure 11:
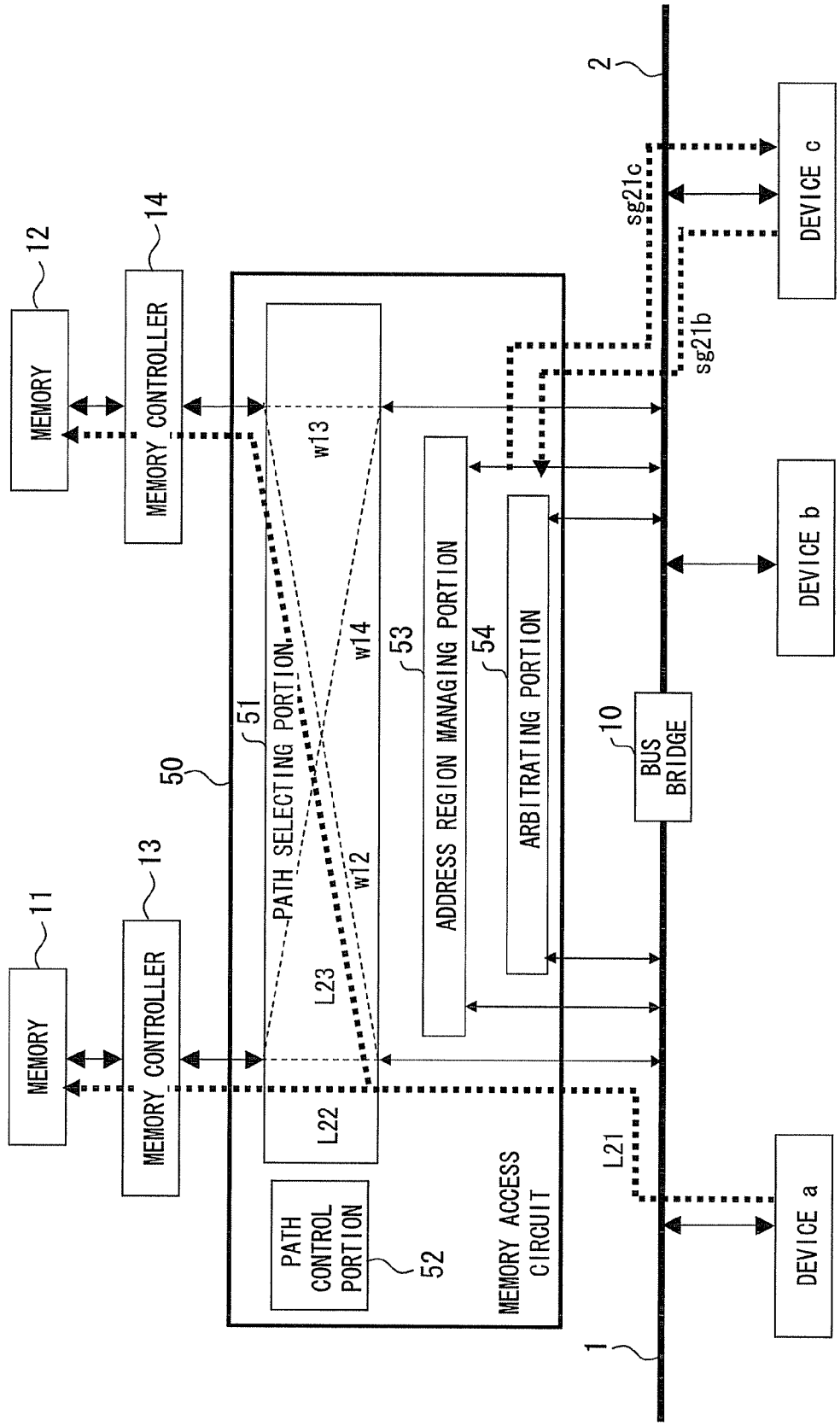
FIG. 11 is a schematic diagram of an operation example by an arbitrating portion.

FIG. 11 is a schematic diagram of an operation example by the arbitrating portion 54. The paths L21, L22 and L23 indicated by the illustrated thick broken lines are the signal-transfer paths when the device a is accessing the memories 11 and 12. Since the bus arbitration between devices connecting to one same bus is performed as usual, the other devices connecting to the same bus do not simultaneously issue requests to access the memories.

FIG. 11 illustrates the case where the device c issues an access request while the device a is accessing the memories 11 and 12 through the path L21, L22 and L23 in the mirror mode. The arbitrating portion 54 performs arbitration processing so as to prevent the conflict between the memory access from the bus-1 side and the memory access from the bus-2 side. Since the device a is in memory access in the mirror mode, the arbitrating portion 54 has received the access signal (or busy signal) from the memory controllers 13 and 14. Thus, the arbitrating portion 54 determines that other devices are accessing both of the memories 11 and 12 and inhibits the accesses in response to the access request signal sg21b from the device c. When the memory access by the device a ends and the reception of the access signals (or busy signals) from the memory controllers 13 and 14 ends, the arbitrating portion 54 transmits the access permission signal sg21c to the device c. Then, the device c in response to the access permission signal sg21c performs the memory access processing in the mirror mode.

Figure 12:
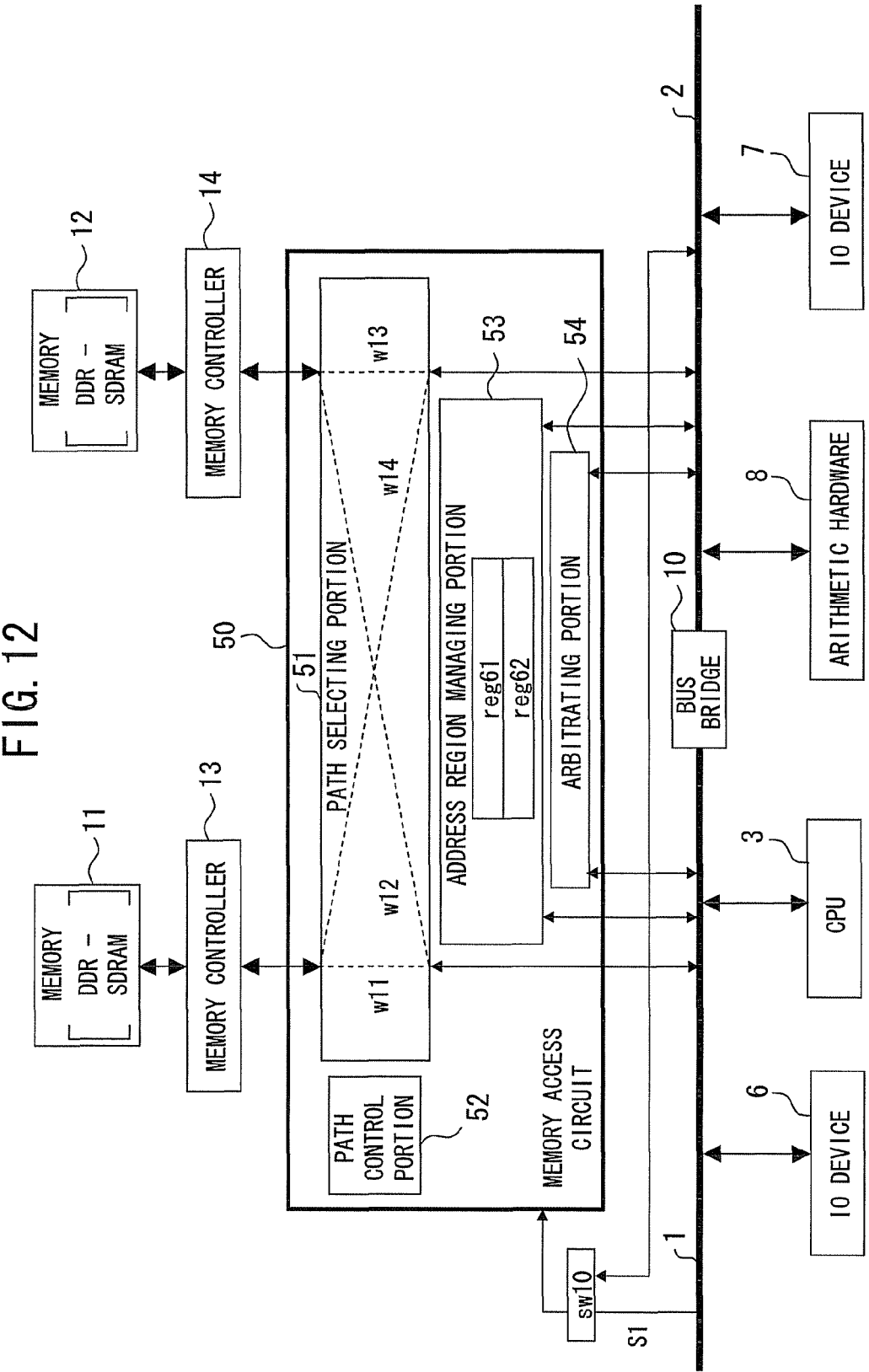
FIG. 12 is a schematic diagram of a concrete configuration example of a system LSI.

Concrete Operation Examples by System LSI and Effects According to This Embodiment FIG. 12 is a schematic diagram of a concrete configuration example of the system LSI. The system LSI has the bus 1 connecting to the CPU 3 and an IO device 6 and the bus 2 connecting to arithmetic hardware 8 and an IO device 7. The arithmetic hardware 8 is a hardware circuit for performing arithmetic processing, and the IO devices 6 and 7 are peripheral circuits for input/output to/from the outside. Each of the memories 11 and 12 may be a DDR-SDRAM (Double-Data-Rate Synchronous Dynamic Random Access Memory) for storing data. The other components are as described above, and the same reference numerals are given to the corresponding components.

An operation example including memory access processing by the system LSI will be described below. First of all, the outline of the operation will be described. With the setting of the one-all mode, the IO device 7 first reads external data through the path w13 or path w14 to the memories 11 and 12. Next, with the setting of the cross mode, the CPU 3 accesses the memory 12 through the path w12, and the arithmetic hardware 8 accesses the memory 11 through the path w14. Both of the devices 3 and 8 simultaneously perform arithmetic processing on the external data read to the memories 11 and 12 by the IO device 7. Then, the arithmetic results are written to the memories 11 and 12 being accessed. Then, with the setting of the one-all mode again, the IO device 7 reads the arithmetic results from the memories 11 and 12 through the path w13 or path w14 to an external memory.

Next, details of the operation will be described. The CPU 3 first sets the CPU address space, which is an address designated in memory access by the CPU 3 or another device, in the one-all mode to the values of the registers reg61 and 62 in the address region managing portion 53.

The CPU 3 further sets the path mode in the memory access circuit 50 to the one-all mode. In order to do so, the CPU 3 transmits the path-selection-mode setting signal S1 indicating the one-all mode to the memory access circuit 50. Then, the portions 51 to 54 within the memory access circuit 50 are set to the one-all mode in accordance with the path-selection-mode setting signal S1.

The CPU 3 transmits a command to read and transfer a group of external data to the memories 11 and 12 to the IO device 7 through the bus bridge 10. Then, the IO device 7 in response to the command reads external data from an external memory, not illustrated, and starts transferring the data to the memory 11 or memory 12. The IO device 7 first transmits an access request signal to the arbitrating portion 54, and the arbitrating portion 54 in response to the signal performs arbitration processing. Then, the arbitrating portion 54 further refers to the access signals (or busy signals) from the memories 11 and 12 because the path mode is set in the one-all mode. Since the access signals (or busy signals) do not indicate the busy state, the arbitrating portion 54 transmits the access permission signal to the IO device 7 and permits the memory access.

The IO device 7 further designates a destination CPU address in the memories 11 and 12 every time a group of signals are transferred. The address region managing portion 53 refers to the values of the registers reg61 and 62, performs address conversion on the address signal input from the IO device 7 and identifies the memory 11 or 12 to receive the signal.

The address region managing portion 53 further receives a bus identification signal indicating that the bus-2 side has issued an access request from the arbitrating portion 54 and transmits the memory identification signal having the identification information of the memory and the identification information of the bus to the path control portion 52.

The path control portion 52 selects the access path w13 or w14 in the path selecting portion 51 properly on the basis of the memory identification signal. In this way, the group of external data read through the IO device 7 is written to the memory 11 or memory 12 in accordance with the address designated by the IO device 7 every transfer.

Since the bus 1 is not occupied during the transfer of external data through the IO device 7 to the memories 11 and 12, the CPU 3 can occupy the bus 1. So, the CPU 3 acquires operation data in an external memory, not illustrated, through the IO device 6 via the bus 1 in order to prepare for the next operation, in parallel with the processing by the IO device 7.

Next, the CPU 3 sets the path mode to the cross mode and performs arithmetic processing in parallel with that by the arithmetic hardware 8. However, as described above, the CPU 3 does not change the path mode when another device is in memory access in the path mode. Thus, when the CPU 3 completes the acquisition of data through the IO device 6 before the IO device 7 completes the processing of reading external data, the CPU 3 awaits the completion of the processing by the IO device 7.

After the processing of reading external data to the memory 11 or the memory 12 all completes, the IO device 7 transmits a signal indicating that the processing has completed to the CPU 3. The reception of the signal causes the CPU 3 to determine that the processing has all completed in the one-all mode and change the path mode to the cross mode.

The CPU 3 transmits the path-selection-mode setting signal 51 indicating the cross mode to the memory access circuit 50. Then, in response to the path-selection-mode setting signal 51, the path control portion 52 within the memory access circuit 50 selects the access path w12 or w14 within the path selecting portion 51.

The CPU 3 transmits a command to start the arithmetic processing through the bus bridge 10 to the arithmetic hardware 8. In response to the command, the arithmetic hardware 8 first transmits an access request signal to the arbitrating portion 54. The arbitrating portion 54 in response to the signal performs the arbitration processing. Since the path mode is set in the cross mode, the arbitrating portion 54 does not refer to the access signals (or busy signals) from the memories 11 and 12 but transmits the access permission signal to the arithmetic hardware 8 to permit the memory access.

Then, the arithmetic hardware 8 reads data written by the IO device 7 from the memory 11 through the access path w14 with the setting of the cross mode, performs the arithmetic processing thereon and writes the arithmetic result to the memory 11 again.

While the arithmetic hardware 8 is reading data from the memory 11 and is performing the arithmetic processing, the bus 1 is not occupied. Thus, the CPU 3 undergoes the arbitration processing in the cross mode like the arithmetic hardware 8 and starts memory access. Since the path mode is the cross mode and the access path w12 is thus selected, the CPU 3 in parallel reads data from the memory 12, performs the arithmetic processing and stores the arithmetic result to the memory 12 again.

Next, the CPU 3 sets the path mode to the one-all mode and reads the arithmetic results from the memories 11 and 12. However, the CPU 3 changes the path mode after the processing in the cross mode all completes, in the same manner as the change of the path mode from the one-all mode to the cross mode. The arithmetic hardware 8 transmits the signal indicating that the arithmetic processing has completed to the CPU 3. When the CPU 3 completes its own arithmetic processing and receives the signal, the CPU 3 determines that the processing has all completed in the cross mode.

Next, the CPU 3 transmits the path-selection-mode setting signal 51 indicating the one-all mode to the memory access circuit 50. Then, the memory access circuit 50 is set in the manner described above for the one-all mode.

The CPU 3 transmits a command to read the arithmetic results stored in the memories 11 and 12 and transfer them to an external memory, not illustrated, through the bus bridge 10 to the IO device 7. The IO device 7 in response to the command starts reading the arithmetic results written in the memories 11 and 12.

The IO device 7 first transmits an access request signal to the arbitrating portion 54. The arbitrating portion 54 in response to the signal performs the arbitration processing in the one-all mode and transmits the access permission signal to the IO device 7 to permit the memory access.

The IO device 7 further identifies the address in the memories 11 and 12 storing the arithmetic results on the basis of the command received from the CPU 3. Thus, the IO device 7 designates the CPU address in the memories 11 and 12 before the arithmetic results are read from the memories 11 and 12. The address region managing portion 53 refers to the registers reg61 and 62, performs address conversion on the designated CPU address signal and identifies the memory 11 or 12 to which the arithmetic results are read. The address region managing portion 53 further receives from the arbitrating portion 54 the bus identification signal indicating that the bus-2 side has issued an access request and transmits the memory identification signal having the identification information of the memory and the identification information of the bus to the path control portion 52.

The path control portion 52 selects the access path w13 or w14 in the path selecting portion 51 properly on the basis of the memory identification signal.

Since the bus 1 is not occupied during the reading by the IO device 7 of the arithmetic results from the memories 11 and 12, the CPU 3 can occupy the bus 1. So, the CPU 3 acquires operation data from the IO device 6 in order to prepare for the next operation for the subsequent processing if any, in parallel with the processing by the IO device 7.

After the processing of reading data from the memories 11 and 12 all completes, the IO device 7 transmits the signal indicating that the processing has completed to the CPU 3. In response to the signal, the CPU 3 determines that the processing in the one-all mode has all completed.

As described above, in the system LSI according to this embodiment, the path mode is changed, and at least one of the access paths w11 to w14 is selected properly. Thus, the devices connecting to the buses can access memories without occupying plural buses. The simultaneous accesses between the devices connecting to the buses and the memories are also allowed. Furthermore, since the devices connecting to the buses can access memories without through the bus bridge, the delay due to data transfer between buses in the bus bridge can be eliminated. So, high-speed memory access can be performed.

According to the first embodiment, the CPU 3 or hardware 4 sets the path mode in the memory access circuit 50, and other devices in the first and second bus systems do not set the path mode.

However, those other devices may set the path mode in the memory access circuit 50. In this case, the arbitrating portion 54 preferably arbitrates path-mode setting request from the devices. The one relating to the arbitration is drawn by the broken lines in the arbitrating portion in FIG. 4. The concrete form will further be described below.

The CPU 3 or a device transmits a path-mode-setting request signal S31 to the arbitrating portion 54 before changing the path mode in accordance with the path-selection-mode setting signal S1. After memory access processing ends in the set path mode, the CPU 3 or device having set the path mode transmits a path-mode end signal S32 to the arbitrating portion 54. The arbitrating portion 54 further has a path-mode-setting flag, which will sometimes simply be called flag, as illustrated in FIG. 4. The path-mode-setting flag indicates "inhibit" while memory access processing is being performed in one path mode and "permit" while it is not. The arbitrating portion 54 in response to the path-mode-setting request signal S31 from a device connecting to the bus 1 or 2 refers to the path-mode-setting flag. When the flag indicates "permit", the arbitrating portion 54 transmits a path-mode-setting permission signal S33 to the device and changes the path-mode-setting flag to "inhibit". When the path-mode-setting flag indicates "inhibit", the arbitrating portion 54 does not transmit the path-mode-setting permission signal S33 but puts the device into a path-mode-setting waiting state. The arbitrating portion 54 in response to the path-mode end signal S32 from the device changes the path-mode-setting flag to "permit".

The device in response to the path-mode-setting permission signal S33 transmits the path-selection-mode setting signal S1 to the memory access circuit 50 and changes the path mode.

An example of the arbitration processing by the arbitrating portion 54 in response to the path-mode setting request from a device will be described below. The following description assumes that, after one device sets the path mode to the separate mode and while a device connecting to the bus-1 side is in memory access, a device connecting to the bus-2 side issues a request for changing the setting to the cross mode.

The device connecting to the bus-2 side transmits the path-mode-setting request signal S31 indicating the cross mode to the arbitrating portion 54. In response to the signal, the arbitrating portion 54 refers to the path-mode-setting flag. Since the device connecting to the bus-1 side is in memory access, the path-mode-setting flag indicates "inhibit". So, the arbitrating portion 54 inhibits the request for setting to the cross mode from the device connecting to the bus-2 side and puts the device into the waiting state.

After the other processing in the separate mode including the memory access processing by the device connecting to the bus-1 side all completes, the device having set the path mode to the separate mode transmits the path-mode end signal S32 to the arbitrating portion 54. The arbitrating portion 54 in response to the signal changes the path-mode-setting flag to "permit", transmits the path-mode-setting permission signal S33 to the device connecting to the bus 2, which is at the waiting state, permits the setting to the cross mode and changes the path-mode-setting flag to "inhibit" again.

Then, the device connecting to the bus 2 in response to the path-mode-setting permission signal S33 from the arbitrating portion 54 transmits the path-selection-mode setting signal S1 indicating the cross mode to the memory access circuit 50, whereby the path mode is changed to the cross mode.

In this way, devices in the first and second bus systems may set the path mode in the memory access circuit 50.

[Second Embodiment]

Figure 13:
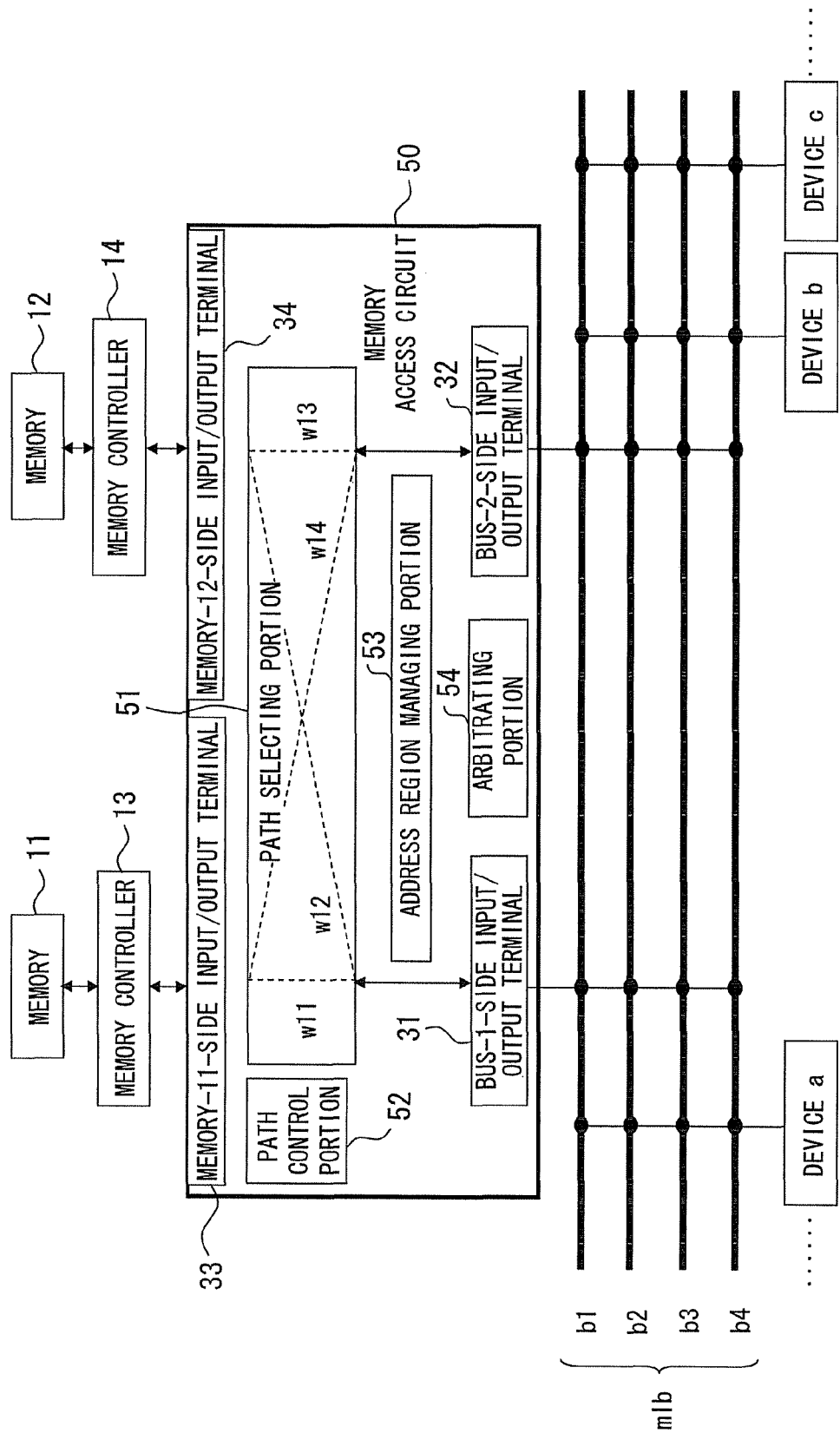
FIG. 13 is a schematic diagram of a system LSI according to a second embodiment.

FIG. 13 is a schematic diagram of a system LSI according to a second embodiment. The system LSI in FIG. 13 is different from that in FIG. 3 in that a multilayer bus mlb is used instead of the buses connected through the bus bridge 10. The same reference numerals are given to the parts corresponding to those in FIG. 3.

FIG. 13 illustrates an example of the system LSI according to the second embodiment. The multilayer bus mlb has four buses b1 to b4, and a device a, a device b and other plural devices including a CPU connect thereto. Each of the devices selects one of the buses b1 to b4 of the multilayer bus mlb and can access another device through the bus. Thus, for example, while the device a is using the bus b1 to access the device b, a device c can use the bus b2 to access another device. In the same manner, buses b3 and b4 may be used for the simultaneous access between other devices. Also in the memory access circuit 50, the bus-1-side input/output terminal 31 and bus-2-side input/output terminal 32, which are input/output interfaces, are allowed to connect to the buses b1 to b4 of the multilayer bus mlb. Then, as described above, when the access paths w11 to w14 are selected, the access paths w11 to w14 are thus set between the buses and the memories.

The case is assumed here that the path mode in the memory access circuit 50 is set to the separate mode, the buses b3 and b4 are occupied by the accesses among the other devices, the buses b1 and b2 are available, and the devices a and b are going to access the memories 11 and 12.

The device a may access the memory 11 through the bus b1, bus-1-side input/output terminal 31 and access path w11, and at the same time the device b accesses the memory 12 through the bus b2, bus-2-side input/output terminal 32 and access path w13. Alternatively, the device a may access the memory 12 through the bus b1, bus-2-side input/output terminal 32 and access path w13, and at the same time the device b may access the memory 11 through the bus b2 and bus-1-side input/output terminal 31 and access path w11. In other words, according to the second embodiment, when at least two buses of the multilayer bus mlb are available, the memory access is allowed that corresponds to the switching of the separate mode and cross mode in the memory access circuit 50. Even when the path mode is set in the cross mode, the simultaneous access between both of the memories and devices are allowed if at least two buses of the multilayer bus mlb are available.

Next, the case is assumed that the path mode in the memory access circuit 50 is set to the separate mode, the buses b2, b3 and b4 are occupied by the accesses among the other devices, the bus b1 is only available, and the devices a and b are going to access the memories 11 and 12.

The device a may access the memory 11 through the bus b1, bus-1-side input/output terminal 31 and access path w11. Alternatively, the device a may access the memory 12 through the bus b1, bus-2-side input/output terminal 32 and access path w13. As described above, the bus arbitration among the devices connecting to the same bus is performed by the CPU, for example, excluding the arbitrating portion 54 as usual. Thus, when the device a is in memory access, all of the buses b1 to b4 are occupied. As a result, the device b is not allowed to obtain the bus right and to access the memories 11 and 12 through the buses b1 to b4. Even when the path selecting function of the memory access circuit 50 is used, the device b without the bus right is not allowed to access the memories either, and the simultaneous accesses between both of the memories and the devices are not allowed. The same is true in the case where the path mode is set to the cross mode.

On the other hand, when the path mode is set to the mirror mode or the one-all mode, the functions of the portions 51 to 54 in the memory access circuit 50 allows both of the devices a and b to perform a predetermined memory access to the memories 11 and 12, as in the first embodiment.

For example, the case is assumed in which the path mode in the memory access circuit 50 is set to the mirror mode, the buses b2, b3 and b4 are occupied by the accesses among the other devices, the bus b1 is only available, and the device a is going to access the memories 11 and 12.

The device a may perform the same access processing simultaneously on the memories 11 and 12 through one of the bus-1-side input/output terminal 31 and the bus-2-side input/output terminal 32. For example, in order for the device a to write data to the memories 11 and 12 through the bus b1 and bus-1-side input/output terminal 31, the arbitrating portion 54 in response to the access request signal from the device a performs arbitration processing first. Since the path mode is set in the mirror mode, the arbitrating portion 54 further refers to the access signals (or busy signals) from the memories 11 and 12. When the access signals (or busy signals) do not indicate the busy state, the arbitrating portion 54 transmits the access permission signal to the device a to permit the memory access. The address region managing portion 53 transfers the access destination address without performing the address conversion. With the setting of the mirror mode, the signal output by the device a and input by the bus-1-side input/output terminal 31 is transferred through the paths w11 and w12 to the memories 11 and 12, and the same data signal is written simultaneously to both of the memories 11 and 12.

Next, the case is assumed in which the path mode in the memory access circuit 50 is set to the one-all mode, the buses b2, b3 and b4 are occupied by the accesses among the other devices, the bus b1 is only available and, the device a is going to access the memories 11 and 12. With the setting of the one-all mode, a series of CPU address spaces are assigned to the memories 11 and 12 as described above. So, the device a handles the memories 11 and 12 as one memory.

The device a may access the memories 11 and 12 through one of the bus-1-side input/output terminal 31 and the bus-2-side input/output terminal 32. For example, in order for the device a to write data to the memory 11 or memory 12 through the bus b1 and bus-1-side input/output terminal 31, the arbitrating portion 54 in response to the access request signal from the device a performs arbitration processing first. Since the path mode is set in the one-all mode, the arbitrating portion 54 further refers to the access signals (or busy signals) from the memories 11 and 12. When the access signals (or busy signals) do not indicate the busy state, the arbitrating portion 54 transmits the access permission signal to the device a to permit the memory access. The address region managing portion 53 performs the address conversion on the destination address to be accessed by the device a and further identifies the memory to access. The address region managing portion 53 further receives the bus identification signal indicating that it is input from the arbitrating portion 54 through the bus-1-side input/output terminal 31 and transmits the memory identification signal having the identification information of the memory and the identification information of the bus to the path control portion 52. The path control portion 52 selects the access path w11 or the access path w12 in the path selecting portion 51 properly in accordance with the memory identification signal. Then, the device a accesses the memory 11 or 12 through the selected access path w11 or w12.

In this way, when the path mode is the mirror mode, a device can perform the same processing simultaneously on plural memories. In the one-all mode, a device can handle plural memories as one memory.

In other words, the memory access circuit 50 connecting to the multilayer bus mlb according to the second embodiment is effective in the mirror mode or one-all mode.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A system LSI comprising:
   first and second memories;
   first and second buses;

a bus bridge that performs signal transfer between the first and second buses;

a memory access circuit having first and second bus-side input/output terminals that perform signal transfer to/from the first and second buses, first and second memory-side input/output terminals that perform signal transfer to/from the first and second memories, a first access path that connects the first bus-side input/output terminal and the first memory-side input/output terminal, a second access path that connects the second bus-side input/output terminal and the second memory-side input/output terminal, a third access path that connects the first bus-side input/output terminal and the second memory-side input/output terminal, a fourth access path that connects the second bus-side input/output terminal and the first memory-side input/output terminal, an address region managing portion that receives an access destination address in the first or second memory, which is output by the first or second bus; and outputs a signal that designates the first or second memory address in accordance with a path-selection-mode setting signal to the first or second memory-side input/output terminal, wherein the memory access circuit performs signal transfer through the first to fourth access paths; and for memory access by the first or second bus, selects at least one of the first to fourth access paths in accordance with a path-selection-mode setting signal from the first or second bus, wherein the first or second bus has an access destination address space including a first address space in the first memory and a second address space, which is continuous to the first address space, in the second memory; and if the path-selection-mode setting signal indicates a one-all mode, the address region managing portion identifies either first or second memory to access on the basis of the access destination address space, converts the access destination address to an address in the first or second address space and outputs the result, and the memory access circuit selects one of the first to fourth access paths in accordance with the identification result by the address region managing portion.

2. The system LSI according to claim 1,
the memory access circuit having an arbitrating portion, wherein:
the arbitrating portion
receives busy signals indicating memory access by the first or second bus; and
when receiving an access request signal from the first or second bus to the first or second memory,
in accordance with the path-selection-mode setting signal,
permits accessing memory without reference to the busy signals; or
refers to the busy signals and inhibits accessing memory if at least one memory is being accessed or permits accessing memory if both of the memories are not being accessed.

3. The system LSI according to claim 1, wherein:
the memory access circuit
selects the first and second access paths if the path-selection-mode setting signal indicates a separate mode; or
selects the third and fourth access paths if the path-selection-mode setting signal indicates a cross mode.

4. The system LSI according to claim 3,
wherein:
the address region managing portion outputs the access destination address without performing address conversion thereon if the path-selection-mode setting signal indicates the separate mode or the cross mode.

5. The system LSI according to claim 1, wherein:
the memory access circuit
selects the first to the fourth access paths if the path-selection-mode setting signal indicates a mirror mode.

6. The system LSI according to claim 5,
wherein:
an address region managing portion outputs the access destination address without performing address conversion thereon if the path-selection-mode setting signal indicates the mirror mode.

7. The system LSI according to claim 1, wherein:
the memory access circuit selects the first and third access paths or the second and fourth access paths if the path-selection-mode setting signal indicates a mirror mode.

8. The system LSI according to claim 1,
the memory access circuit having an arbitrating portion, wherein:
the arbitrating portion receives busy signals indicating memory access by the first or second bus; and when receiving an access request signal from the first or second bus to the first or second memory, if the path-selection-mode setting signal indicates a separate mode in which the first and second access paths are selected or a cross mode in which the third and fourth access paths are selected, permits accessing memory without reference to the busy signals, or if the path-selection-mode setting signal indicates a mirror mode in which the first to fourth access paths are selected or a one-all mode in which one of the first to fourth access paths is selected, refers to the busy signals and inhibits accessing memory if at least one memory is being accessed and permits the access if both of the memories are not being accessed.

9. The system LSI according to claim 1, wherein the first and second buses connect to data processing circuits that perform data processing, and the first and second bus perform processing by reading signals simultaneously from one of the first and second memory and the other, respectively.

10. The system LSI according to claim 1, wherein the memory access circuit has two or more path modes, the path mode includes a separate mode in which the first and second access paths are selected, a cross mode in which the third and fourth access paths are selected, a mirror mode in which the first to fourth access paths are selected, and a one-all mode in which one of the first to fourth access paths is selected and the memory access circuit selects an access path in accordance with the path-selection-mode setting signal.

11. The system LSI according to claim 10, wherein in the one-all mode, the first and second bus have an access destination address space including a first address space in the first memory and a second address space, which is continuous to the first address space, in the second memory; and the address region managing portion identifies either first or second memory to access on the basis of the access destination address space, converts the access destination address to an address in the first or second address space and outputs the result, and the memory access circuit selects one of the first to fourth access paths in accordance with the identification result by the address region managing portion.

12. A system LSI having first and second memories, the system comprising:
- a plurality of buses;
- a memory access circuit having first and second bus-side input/output terminals that perform signal transfer to/from one of the plurality of buses, first and second memory-side input/output terminals that perform signal transfer to/from the first and second memories,
- a first access path that connects the first bus-side input/output terminal and the first memory-side input/output terminal,
- a second access path that connects the second bus-side input/output terminal and the second memory-side input/output terminal,
- a third access path that connects the first bus-side input/output terminal and the second memory-side input/output terminal,
- a fourth access path that connects the second bus-side input/output terminal and the first memory-side input/output terminal,
- an address region managing portion that receives an access destination address in the first or second memory, which is output by one of the plurality of buses; and outputs a signal that designates the first or second memory address in accordance with a path-selection-mode setting signal to the first or second memory-side input/output terminal, wherein
- the memory access circuit performs signal transfer through the first to fourth access path; and
- for memory access by one of the plurality of buses, selects at least one of the first to fourth access paths in accordance with a path-selection-mode setting signal from one of the plurality of buses, wherein the plurality of buses have an access destination address space including a first address space in the first memory and a second address space, which is continuous to the first address space, in the second memory; and
- if the path-selection-mode setting signal indicates a one-all mode, the address region managing portion identifies either first or second memory to access on the basis of the access destination address space, converts the access destination address to an address in the first or second address space and outputs the result, and the memory access circuit selects one of the first to fourth access paths in accordance with the identification result by the address region managing portion.

13. The system LSI according to claim 12, wherein:
the memory access circuit selects the first to the fourth access paths if the path-selection-mode setting signal indicates a mirror mode.

14. The system LSI according to claim 13,
wherein the address region managing portion outputs the access destination address without address conversion thereon if the path-selection-mode setting signal indicates the mirror mode.

15. The system LSI according to claim 12, wherein:
the memory access circuit selects the first and third access paths or the second and fourth access paths if the path-selection-mode setting signal indicates a mirror mode.

* * * * *

UNITED STATES PATENT AND TRADEMARK OFFICE
CERTIFICATE OF CORRECTION

PATENT NO. : 8,359,419 B2  
APPLICATION NO. : 12/617291  
DATED : January 22, 2013  
INVENTOR(S) : Shinichi Sutou et al.

Page 1 of 1

It is certified that error appears in the above-identified patent and that said Letters Patent is hereby corrected as shown below:

In the Claims:

Column 21, Line 19, In Claim 1, delete "terminal," and insert -- terminal and, --, therefor.

Signed and Sealed this
Thirtieth Day of April, 2013

Teresa Stanek Rea
*Acting Director of the United States Patent and Trademark Office*